US012782840B2

(12) United States Patent
Higashihara et al.

(10) Patent No.: US 12,782,840 B2
(45) Date of Patent: Nov. 3, 2026

(54) SCANNING OPTICAL DEVICE INCLUDING LIGHT-SHIELDING WALL FOR SHIELDING STRAY LIGHTS, AND IMAGE FORMING APPARATUS INCLUDING THE SAME

(71) Applicant: BROTHER KOGYO KABUSHIKI KAISHA, Nagoya (JP)

(72) Inventors: Naoya Higashihara, Toyoake (JP); Junichi Yokoi, Nagoya (JP); Hiroyuki Ominato, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/942,971

(22) Filed: Nov. 11, 2024

(65) Prior Publication Data

US 2025/0181005 A1 Jun. 5, 2025

(30) Foreign Application Priority Data

Nov. 30, 2023 (JP) ................................ 2023-203072
Nov. 30, 2023 (JP) ................................ 2023-203075

(51) Int. Cl.

| | |
|---|---|
| ***G03G 15/04*** | (2006.01) |
| ***B41J 2/447*** | (2006.01) |
| ***B41J 2/47*** | (2006.01) |
| ***G02B 26/12*** | (2006.01) |
| ***G03G 15/041*** | (2006.01) |

(52) U.S. Cl.

CPC .......... *G03G 15/0415* (2013.01); *B41J 2/447* (2013.01); *B41J 2/473* (2013.01); *G02B 26/123* (2013.01); *G03G 15/04036* (2013.01); *G03G 15/0409* (2013.01)

(58) Field of Classification Search

USPC .......................................................... 399/199

See application file for complete search history.

(56) References Cited

U.S. PATENT DOCUMENTS

2004/0263933 A1 12/2004 Nakahata
2008/0298839 A1 12/2008 Tomioka
(Continued)

FOREIGN PATENT DOCUMENTS

JP 10-41588 A 2/1998
JP 2005-4050 A 1/2005
(Continued)

*Primary Examiner* — Quana Grainger
(74) *Attorney, Agent, or Firm* — Merchant & Gould P.C.

(57) ABSTRACT

A scanning optical device includes: a first light source device configured to emit a first beam; a second light source device configured to emit a second beam; a deflector configured to deflect the first beam and the second beam; a first scanning optical system including a first scanning lens and configured to form an image on a first surface to be scanned using the deflected first beam; a second scanning optical system configured to form an image on a second surface to be scanned using the deflected second beam; a cover including a cover base wall and a first light-shielding wall; and a frame including a frame base wall and a second light-shielding wall. The first scanning lens has an incident surface and an emitting surface opposite the incident surface. The first light-shielding wall overlaps with the incident surface. The second light-shielding wall overlaps with the emitting surface.

15 Claims, 15 Drawing Sheets

(56) References Cited

U.S. PATENT DOCUMENTS

| | | | | |
|---|---|---|---|---|
| 2018/0231914 | A1 | 8/2018 | Imai et al. | |
| 2020/0166864 | A1* | 5/2020 | Yoshida ............... | G02B 26/124 |

FOREIGN PATENT DOCUMENTS

| | | | |
|---|---|---|---|
| JP | 2005-091714 | A | 4/2005 |
| JP | 2010-224552 | A | 10/2010 |
| JP | 2011-107402 | A | 6/2011 |
| JP | 2018-132638 | A | 8/2018 |

* cited by examiner

SCANNING OPTICAL DEVICE INCLUDING LIGHT-SHIELDING WALL FOR SHIELDING STRAY LIGHTS, AND IMAGE FORMING APPARATUS INCLUDING THE SAME

REFERENCE TO RELATED APPLICATIONS

This application claims priorities from Japanese Patent Application No. 2023-203072 filed on Nov. 30, 2023, and Japanese Patent Application No. 2023-203075 filed on Nov. 30, 2023. The entire contents of the priority applications are incorporated herein by reference.

BACKGROUND ART

There has been conventionally known a scanning optical device including a polygon mirror configured to deflect and scan a beam, a first imaging lens configured to form an image on a drum using the beam, and a second imaging lens configured to form another image on another drum using another beam. The first imaging lens and the second imaging lens face each other with the polygon mirror being interposed therebetween.

In the conventional scanning optical device, a light-shielding wall is positioned between the polygon mirror and each of the first and second imaging lenses. Each of the light-shielding walls has an aperture diaphragm allowing a beam deflected by the polygon mirror to pass therethrough. Further, each of the light-shielding walls is configured to block a beam (stray light) reflected by an incident surface of one of the imaging lenses so that the stray light does not enter the other of the imaging lenses.

SUMMARY

In the structure in the conventional scanning optical device, the entirety of each light-shielding wall is positioned in a narrow space between the polygon mirror and the corresponding imaging lens. That is, a distance between the polygon mirror and the light-shielding wall is short, and therefore, noise is likely to increase because of repeated compression of air existing between the polygon mirror and the light-shielding wall when the polygon mirror rotates.

In view of the foregoing, it is an object of the present disclosure to provide a scanning optical device in which generation of noise due to rotation of a polygon mirror can be restrained while stray light is shielded.

In order to attain the above and other objects, the present disclosure provides a scanning optical device including: a first light source device; a second light source device; a deflector; a first scanning optical system; a second scanning optical system; a frame; and a cover. The first light source device is configured to emit a first beam. The second light source device is configured to emit a second beam. The deflector includes a polygon mirror rotatable about a rotation axis extending in a first direction. The deflector is configured to deflect the first beam and the second beam. The first scanning optical system includes a first scanning lens on which the first beam deflected by the deflector is configured to be incident. The first scanning optical system is configured to form an image on a first surface to be scanned using the first beam deflected by the deflector. The first scanning lens has an incident surface and an emitting surface opposite the incident surface. The second scanning optical system includes a second scanning lens on which the second beam deflected by the deflector is configured to be incident. The second scanning optical system is configured to form an image on a second surface to be scanned using the second beam deflected by the deflector. The second scanning lens is positioned on an opposite side of the polygon mirror from the first scanning lens in a second direction orthogonal to the first direction. The frame includes: a frame base wall on which the deflector is mounted. The cover includes: a cover base wall positioned on an opposite side of the deflector from the frame base wall in the first direction and covering the deflector. The cover further includes: a first light-shielding wall extending toward the frame base wall from the cover base wall. The first light-shielding wall is positioned between the polygon mirror and the first scanning lens. The first light-shielding wall overlaps with the incident surface when viewed in the second direction. The frame further includes: a second light-shielding wall extending toward the cover base wall from the frame base wall. The second light-shielding wall is positioned closer to the emitting surface than to the incident surface. The second light-shielding wall overlaps with the emitting surface when viewed in the second direction.

In the above structure, since the scanning optical device includes the first light-shielding wall and the second light-shielding wall, lights reflected by the second scanning lens (stray lights) can be shielded using the first light-shielding wall and the second light-shielding wall. Further, the second light-shielding wall, which extends from the frame base wall on which the deflector is mounted, is positioned closer to the emitting surface of the first scanning lens than to the incident surface. This structure can ensure a distance from the polygon mirror to the second light-shielding wall, thereby restraining generation of noise due to rotation of the polygon mirror.

According to another aspect, the present disclosure also provides an image forming apparatus including a scanning optical device including: a first light source device; a second light source device; a deflector; a first scanning optical system; a second scanning optical system; a frame; and a cover. The first light source device is configured to emit a first beam. The second light source device is configured to emit a second beam. The deflector includes a polygon mirror rotatable about a rotation axis extending in a first direction. The deflector is configured to deflect the first beam and the second beam. The first scanning optical system includes a first scanning lens on which the first beam deflected by the deflector is configured to be incident. The first scanning optical system is configured to form an image on a first surface to be scanned using the first beam deflected by the deflector. The first scanning lens has an incident surface and an emitting surface opposite the incident surface. The second scanning optical system includes a second scanning lens on which the second beam deflected by the deflector is configured to be incident. The second scanning optical system is configured to form an image on a second surface to be scanned using the second beam deflected by the deflector. The second scanning lens is positioned on an opposite side of the polygon mirror from the first scanning lens in a second direction orthogonal to the first direction. The frame includes: a frame base wall on which the deflector is mounted. The cover includes: a cover base wall positioned on an opposite side of the deflector from the frame base wall in the first direction and covering the deflector. The cover further includes: a first light-shielding wall extending toward the frame base wall from the cover base wall. The first light-shielding wall is positioned between the polygon mirror and the first scanning lens. The first light-shielding wall overlaps with the incident surface when viewed in the second direction. The frame further includes: a second light-shielding wall extending toward the cover base wall from the frame base wall. The second light-shielding wall is positioned closer to the emitting surface than to the incident surface. The second light-shielding wall overlaps with the emitting surface when viewed in the second direction. The scanning optical device is provided while the frame base wall is positioned upward of the deflector and the cover base wall is positioned downward of the deflector.

The image forming apparatus according to the other aspect, which incorporates the scanning optical device according to the aspect, can also exhibit the technical advantages that can be obtained by the scanning optical device according to the aspect.

According to still another aspect, the present disclosure also provides a scanning optical device including: a first light source device; a second light source device; a deflector; a first scanning lens; a second scanning lens; a frame base wall; and a cover base wall. The first light source device is configured to emit a first beam. The second light source device is configured to emit a second beam. The deflector includes a polygon mirror rotatable about a rotation axis extending in a first direction. The deflector is configured to deflect the first beam and the second beam. The first beam deflected by the deflector is configured to be incident on the first scanning lens. The first scanning lens has an incident surface and an emitting surface opposite the incident surface. The second beam deflected by the deflector is configured to be incident on the second scanning lens. The second scanning lens is positioned on an opposite side of the polygon mirror from the first scanning lens in a second direction orthogonal to the first direction. The deflector is mounted on the frame base wall. The cover base wall is positioned on an opposite side of the deflector from the frame base wall in the first direction and covers the deflector. The first light-shielding wall extends toward the frame base wall from the cover base wall. The first light-shielding wall is positioned between the polygon mirror and the first scanning lens. The first light-shielding wall overlaps with the incident surface when viewed in the second direction.

In the above structure, since the scanning optical device includes the first light-shielding wall, lights reflected by the second scanning lens (stray lights) can be shielded using the first light-shielding wall.

DESCRIPTION

Hereinafter, one embodiment of the present disclosure will be described while referring to the accompanying drawings.

Figure 1:
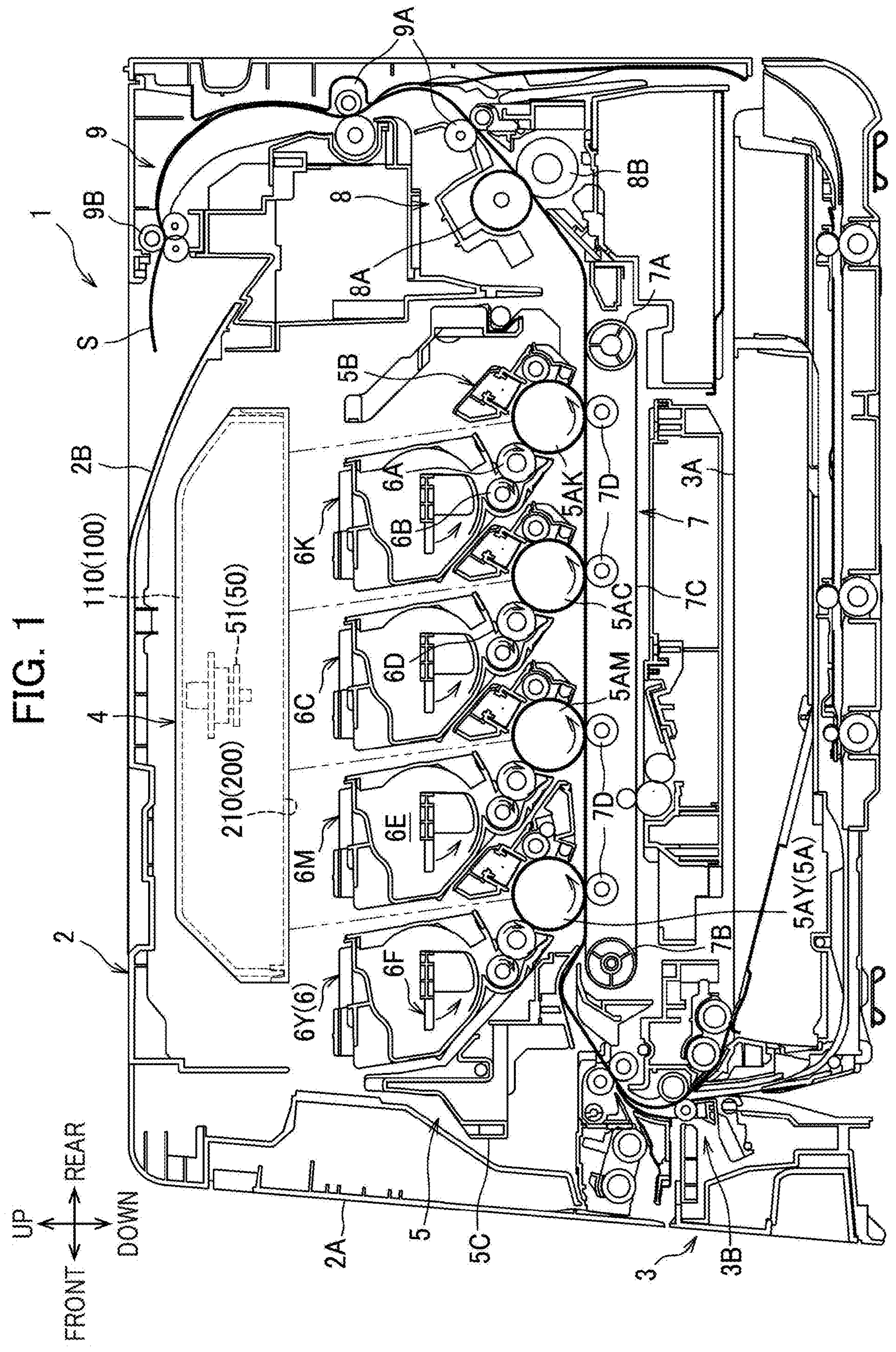
FIG. 1 is a cross-sectional view of an image forming apparatus.

An image forming apparatus 1 illustrated in FIG. 1 is an electrophotographic-type image forming apparatus. In the present embodiment, the image forming apparatus 1 is a color laser printer. The image forming apparatus 1 includes a main housing 2, a sheet-feeding unit 3, a scanning optical device 4, a drum unit 5, four developing cartridges 6, a transfer unit 7, a fixing unit 8, and a sheet-discharging unit 9.

The main housing 2 includes a front cover 2A, and a discharge tray 2B. The front cover 2A is configured to open and close a front opening of the main housing 2.

The sheet-feeding unit 3 is positioned at a lower portion inside the main housing 2. The sheet-feeding unit 3 includes a sheet tray 3A, and a sheet-feeding mechanism 3B. The sheet tray 3A is configured to accommodate therein a sheet(s) S such as sheet of paper. The sheet-feeding mechanism 3B is configured to feed the sheet S in the sheet tray 3A to a portion between photosensitive drums 5A and a transfer belt 7C.

The scanning optical device 4 is positioned at an upper portion inside the main housing 2. The scanning optical device 4 is configured to emit laser beam as indicated by phantom lines in FIG. 1 to expose surfaces of the photosensitive drums 5A to light.

The drum unit 5 is positioned between the sheet tray 3A and the scanning optical device 4. The drum unit 5 is attachable to and detachable from the main housing 2 through the front opening of the main housing 2 while the front opening is opened by the front cover 2A. The drum unit 5 includes the four photosensitive drums 5A, four chargers 5B, and a drum frame 5C. The drum frame 5C supports the photosensitive drums 5A and the chargers 5B.

In the present embodiment, the photosensitive drums 5A include a photosensitive drum 5AY on which an yellow toner image is configured to be formed, a photosensitive drum 5AM on which a magenta toner image is configured to be formed, a photosensitive drum 5AC on which a cyan toner image is configured to be formed, and a photosensitive drum 5AK on which a black toner image is configured to be formed. The four photosensitive drums 5A are arranged from front to rear, i.e., from the upstream side to the downstream side in a conveying direction of the sheet S in the order of the photosensitive drum 5AY, the photosensitive drum 5AM, the photosensitive drum 5AC, and the photosensitive drum 5AK.

Each of the developing cartridges 6 is attachable to and detachable from the drum frame 5C of the drum unit 5. Each of the developing cartridges 6 includes a developing roller 6A, a supply roller 6B, a layer-thickness regulation blade 6D, a toner accommodating portion 6E configured to accommodate toner therein, and an agitator 6F.

The agitator 6F is configured to agitate toner accommodated in the toner accommodating portion 6E. The agitator 6F is also configured to supply toner in the toner accommodating portion 6E to the supply roller 6B. The supply roller 6B is configured to supply toner to the developing roller 6A. The layer-thickness regulation blade 6D is configured to regulate a thickness of a toner layer formed on the developing roller 6A so that the toner layer is formed to have a constant thickness.

The developing cartridges 6 are configured to accommodate therein toner of colors different from one another. In the present embodiment, the developing cartridges 6 include a developing cartridge 6Y configured to accommodate therein yellow toner, a developing cartridge 6M configured to accommodate therein magenta toner, a developing cartridge 6C configured to accommodate therein cyan toner, and a developing cartridge 6K configured to accommodate therein black toner.

The transfer unit 7 is positioned between the sheet tray 3A and the drum unit 5. The transfer unit 7 includes a drive roller 7A, a driven roller 7B, the transfer belt 7C, and four transfer rollers 7D. The transfer belt 7C is in a form of an endless belt. The drive roller 7A and the driven roller 7B are configured to cause the transfer belt 7C to circularly move. The transfer rollers 7D are positioned within a space encircled by the transfer belt 7C. The transfer rollers 7D are configured to nip the transfer belt 7C between the transfer rollers 7D and the corresponding photosensitive drums 5A.

The fixing unit 8 is positioned rearward of the drum unit 5. The fixing unit 8 includes a heat roller 8A, and a pressure roller 8B. The heat roller 8A is configured to heat the sheet S. The pressure roller 8B is configured to nip the sheet S between the pressure roller 8B and the heat roller 8A.

The chargers 5B are configured to charge the surfaces of the corresponding photosensitive drums 5A. The scanning optical device 4 emits laser beam to expose the surfaces of the photosensitive drums 5A to light, thereby forming electrostatic latent images on the photosensitive drums 5A. The developing rollers 6A supply toner to the corresponding photosensitive drums 5A, whereby toner images are formed on the photosensitive drums 5A.

The sheet S is conveyed between the photosensitive drums 5A on which the toner images are formed and the corresponding transfer rollers 7D. Hence, the toner images are transferred onto the sheet S. The sheet S on which the toner images are transferred is conveyed between the heat roller 8A and the pressure roller 8B. As a result, the toner images are fixed to the sheet S.

The sheet-discharging unit 9 includes conveying rollers 9A, and a discharging roller 9B. The conveying rollers 9A are configured to convey the sheet S on which the toner images are fixed toward the discharging roller 9B. The discharging roller 9B is configured to discharge the sheet S onto the discharge tray 2B.

Figure 2:
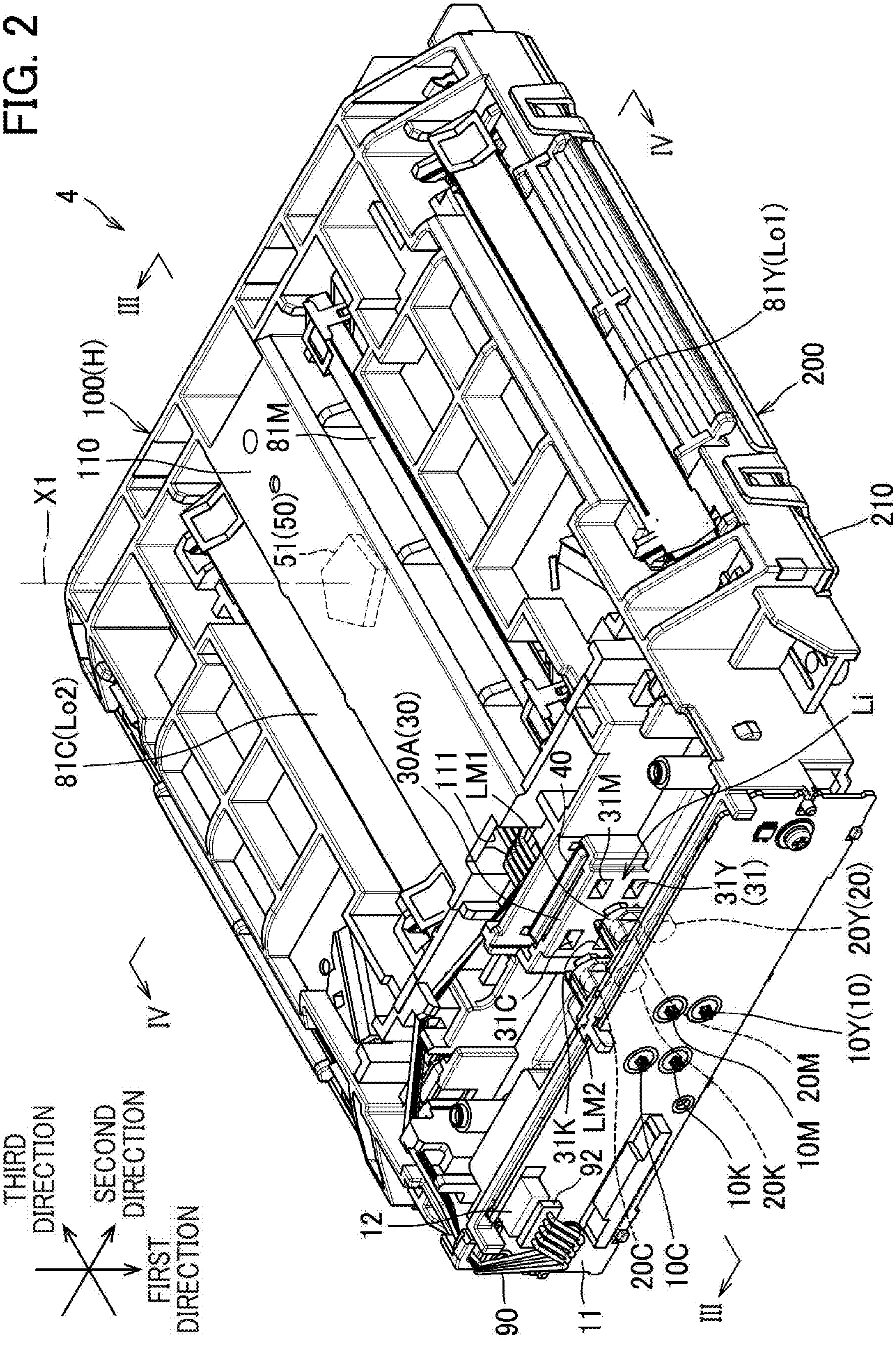
FIG. 2 is a perspective view of a scanning optical device.

As illustrated in FIG. 2, the scanning optical device 4 includes a casing H, an incident optical system Li, a deflector 50, and scanning optical systems Lo1 and Lo2.

Hereinafter, in the referenced drawings, arrows are used to indicate a first direction, a second direction, and a third direction. In these drawings, each arrow points to one side in the corresponding direction. Specifically, a leading side of each arrow represents one side in the corresponding direction, and a trailing side of each arrow represents the other side in the corresponding direction.

The first direction is a direction in which a rotation axis X1 of a polygon mirror 51 (described later) of the deflector 50 extends. The second direction is orthogonal to the first direction. The third direction is orthogonal to both the first direction and the second direction. The third direction in the present embodiment corresponds to a main scanning direction in the scanning optical device 4.

Figure 3:
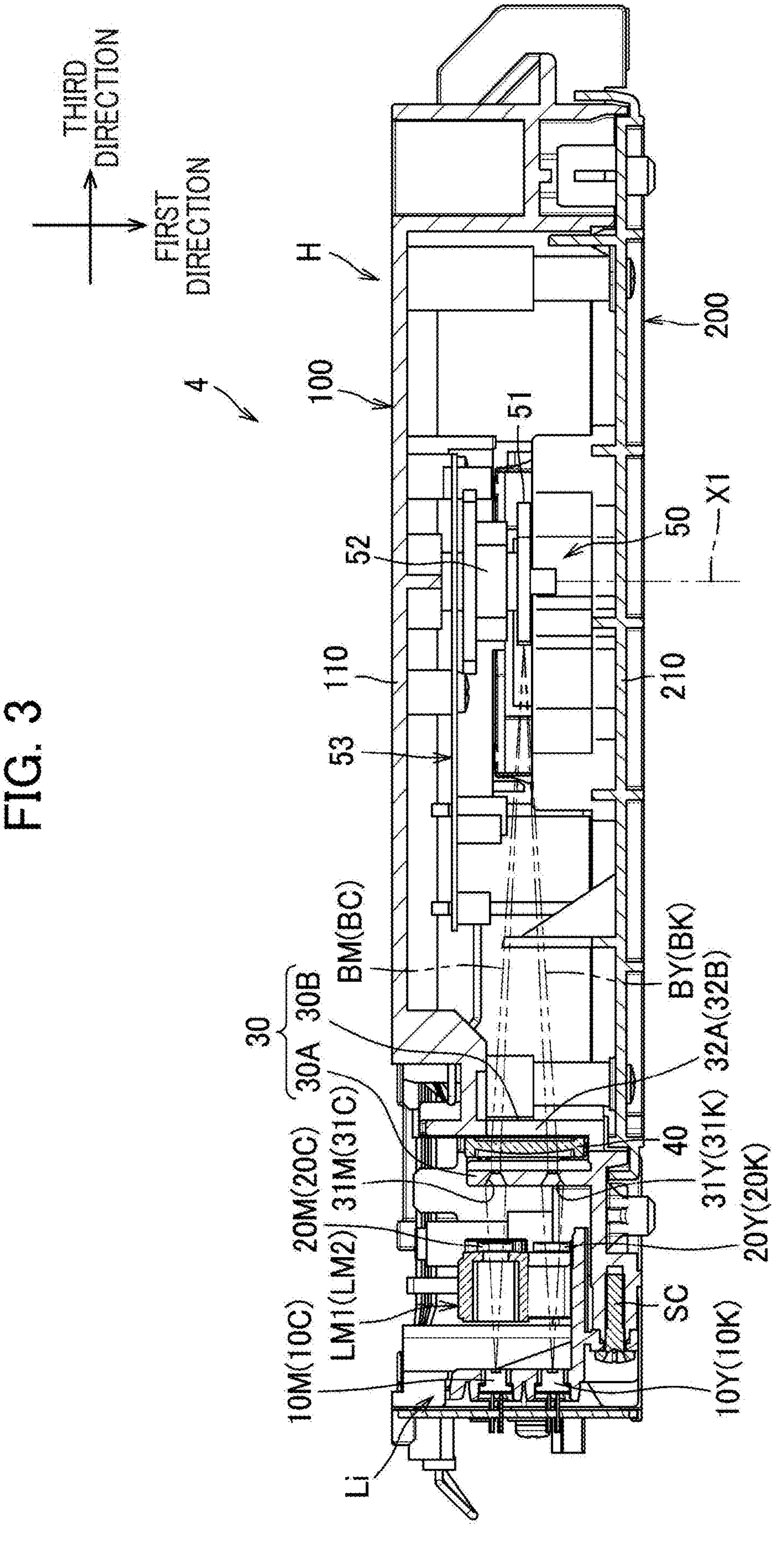
FIG. 3 is a cross-sectional view taken along line III-III in FIG. 2.

As illustrated in FIG. 3, the casing H includes a frame 100, and a cover 200. The frame 100 includes a frame base wall 110 on the other side thereof in the first direction. The frame base wall 110 is a wall on which the deflector 50 is mounted.

The cover 200 includes a cover base wall 210 on the one side thereof in the first direction. The cover base wall 210 is a wall positioned on the opposite side of the deflector 50 from the frame base wall 110 in the first direction to cover the deflector 50. In other words, the cover base wall 210 covers the deflector 50 on the one side in the first direction of the scanning optical device 4.

In the present embodiment, the scanning optical device 4 is provided in the main housing 2 of the image forming apparatus 1 (see FIG. 1) such that the frame base wall 110 is positioned upward of the deflector 50 and the cover base wall 210 is positioned downward of the deflector 50. That is, in the present embodiment, the first direction corresponds to an up-down direction of the image forming apparatus 1. More specifically, the one side in the first direction corresponds to the lower side of the image forming apparatus 1, and the other side in the first direction corresponds to the upper side of the image forming apparatus 1.

The incident optical system Li includes light source devices LM1 and LM2, aperture walls 30, and a condenser lens 40.

The light source devices LM1 and LM2 are configured to emit beams BY, BM, BC, and BK. Specifically, the light source device LM1 is configured to emit the beams BY and BM, and the light source device LM2 is configured to emit the beams BC and BK. As illustrated in FIG. 2, the light source devices LM1 and LM2 are arranged in the second direction. The light source device LM1 is positioned further toward the one side in the second direction relative to the light source device LM2. The light source device LM1 is an example of the "first light source device", and the light source device LM2 is an example of the "second light source device". The beams BY and BM are each an example of the "first beam", and the beams BC and BK are each an example of the "second beam".

Each of the light source devices LM1 and LM2 includes two light sources 10, and two coupling lenses 20. The light sources 10 include a light source 10Y, a light source 10M, a light source 10C, and a light source 10K. The coupling lenses 20 include a coupling lens 20Y, a coupling lens 20M, a coupling lens 20C, and a coupling lens 20K.

Specifically, the light source device LM1 includes the light source 10Y, the light source 10M, the coupling lens 20Y, and the coupling lens 20M. The light source device LM2 includes the light source 10C, the light source 10K, the coupling lens 20C, and the coupling lens 20K.

In the present embodiment, each of the light sources 10 is a semiconductor laser configured to emit laser light. The light source 10Y is configured to emit laser light for exposing the photosensitive drum 5AY for yellow to light. The light source 10M is configured to emit laser light for exposing the photosensitive drum 5AM for magenta to light. The light source 10C is configured to emit laser light for exposing the photosensitive drum 5AC for cyan to light. The light source 10K is configured to emit laser light for exposing the photosensitive drum 5AK for black to light.

The light source 10Y and the light source 10M are arranged in the first direction. The light source 10M is positioned further toward the other side in the first direction relative to the light source 10Y. The light source 10C and the light source 10K are arranged in the first direction. The light source 10C is positioned further toward the other side in the first direction relative to the light source 10K.

The light source 10Y and the light source 10K are arranged in the second direction. The light source 10K is positioned further toward the other side in the second direction relative to the light source 10Y. The light source 10M and the light source 10C are arranged in the second direction. The light source 10C is further toward the other side in the second direction relative to the light source 10M.

The coupling lens 20Y is configured to convert the light emitted from the light source 10Y into the beam BY. The coupling lens 20M is configured to convert the light emitted from the light source 10M into the beam BM. The coupling lens 20C is configured to convert the light emitted from the light source 10C into the beam BC. The coupling lens 20K is configured to convert the light emitted from the light source 10K into the beam BK.

The coupling lens 20Y and the coupling lens 20M are arranged in the first direction. The coupling lens 20M is positioned further toward the other side in the first direction relative to the coupling lens 20Y. In other words, the coupling lens 20M is positioned farther from the cover base wall 210 than the coupling lens 20Y is from the cover base wall 210 in the first direction.

The coupling lens 20C and the coupling lens 20K are arranged in the first direction. The coupling lens 20C is positioned further toward the other side in the first direction relative to the coupling lens 20K. In other words, the coupling lens 20C is positioned farther from the cover base wall 210 than the coupling lens 20K is from the cover base wall 210 in the first direction.

The coupling lens 20Y and the coupling lens 20K are arranged in the second direction. The coupling lens 20K is positioned further toward the other side in the second direction relative to the coupling lens 20Y. The coupling lens 20M and the coupling lens 20C are arranged in the second direction. The coupling lens 20C is positioned further toward the other side in the second direction relative to the coupling lens 20M.

As illustrated in FIG. 3, the condenser lens 40 is configured to refract the beams BY, BM, BC, and BK exiting the corresponding coupling lenses 20 in a sub scanning direction and to focus the beams BY, BM, BC, and BK onto mirror surfaces of the polygon mirror 51. Note that, in the incident optical system Li, the first direction corresponds to the sub scanning direction.

In the present embodiment, the condenser lens 40 is a cylindrical lens having an incident surface which is a cylindrical surface, and an emitting surface which is a flat surface. The condenser lens 40 is configured to refract the beams BY and BK toward the frame base wall 110 in the first direction and to focus the beams BY and BK onto the mirror surfaces of the polygon mirror 51. The condenser lens 40 is also configured to refract the beams BM and BC toward the cover base wall 210 in the first direction and to focus the beams BM and BC onto the mirror surfaces of the polygon mirror 51.

The aperture walls 30 include a first aperture wall 30A, and a second aperture wall 30B. The first aperture wall 30A and the second aperture wall 30B are formed integrally with the frame 100. That is, the frame 100 includes the first aperture wall 30A and the second aperture wall 30B.

The first aperture wall 30A is positioned between the coupling lenses 20Y, 20M, 20C, and 20K and the condenser lens 40. The first aperture wall 30A has aperture diaphragms 31 (see FIG. 2). The aperture diaphragms 31 include an aperture diaphragm 31Y allowing the beam BY traveling from the coupling lens 20Y toward the polygon mirror 51 to pass therethrough, an aperture diaphragm 31M allowing the beam BM traveling from the coupling lens 20M toward the polygon mirror 51 to pass therethrough, an aperture diaphragm 31C allowing the beam BC traveling from the coupling lens 20C toward the polygon mirror 51 to pass therethrough, and an aperture diaphragm 31K allowing the beam BK traveling from the coupling lens 20K toward the polygon mirror 51 to pass therethrough.

The second aperture wall 30B is positioned between the condenser lens 40 and the deflector 50. The condenser lens 40 is positioned between the first aperture wall 30A and the second aperture wall 30B. The second aperture wall 30B has two aperture diaphragms 32A and 32B (see also FIG. 7). The aperture diaphragm 32A allows the beams BY and BM traveling from the corresponding coupling lenses 20Y and 20M toward the polygon mirror 51 to pass therethrough. The aperture diaphragm 32B allows the beams BC and BK traveling from the corresponding coupling lenses 20C and 20K toward the polygon mirror 51 to pass therethrough.

The deflector 50 is configured to deflect the beams BY, BM, BC, and BK in the main scanning direction (i.e., in the third direction). The deflector 50 includes the polygon mirror 51, a motor 52, and a board 53. The polygon mirror 51 is rotatable about the rotation axis X1 extending in the first direction. The polygon mirror 51 has five mirror surfaces that are equidistant from the rotational axis X1 (see also FIG. 2). By rotating, the polygon mirror 51 deflects the beams BY, BM, BC, and BK in the main scanning direction. The motor 52 is configured to rotate the polygon mirror 51. The motor 52 is fixed to the frame 100 through the board 53.

Figure 4:
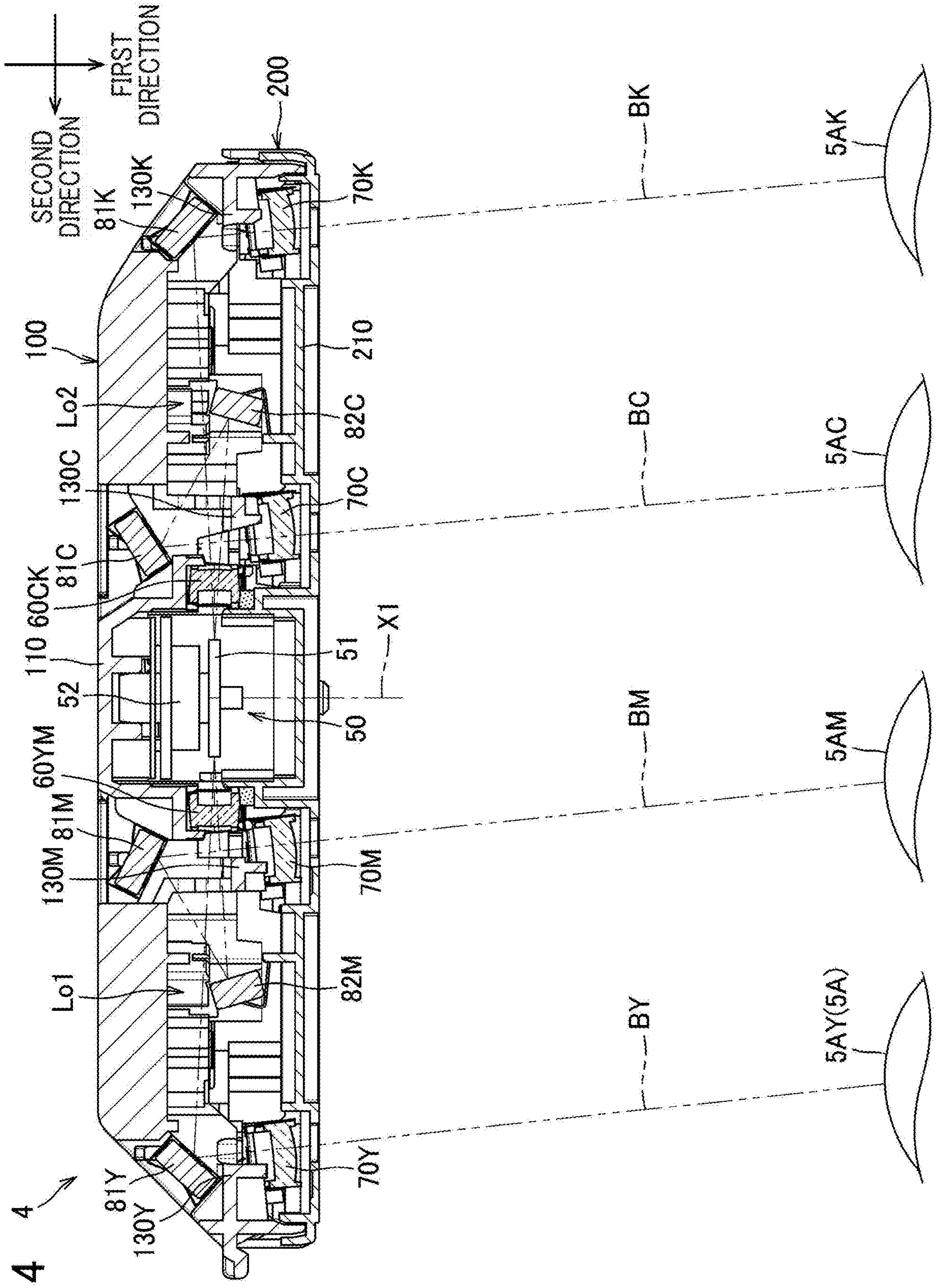
FIG. 4 is a cross-sectional view taken along line IV-IV in FIG. 2.

As illustrated in FIG. 4, the scanning optical systems Lo1 and Lo2 are optical systems configured to form images on the surfaces of the corresponding photosensitive drums 5A, as the surfaces to be scanned, using the beams BY, BM, BC, and BK deflected by the deflector 50. The scanning optical system Lo1 is an example of the "first scanning optical system", and the scanning optical system Lo2 is an example of the "second scanning optical system".

The scanning optical system Lo1 is configured to form an image on the surface of the photosensitive drum 5AY using the beam BY deflected by the deflector 50. Further, the scanning optical system Lo1 is configured to form an image on the surface of the photosensitive drum 5AM using the beam BM deflected by the deflector 50.

The scanning optical system Lo2 is configured to form an image on the surface of the photosensitive drum 5AC using the beam BC deflected by the deflector 50. Further, the scanning optical system Lo2 is configured to form an image on the surface of the photosensitive drum 5AK using the beam BK deflected by the deflector 50.

The scanning optical system Lo1 is positioned further toward the one side in the second direction relative to the polygon mirror 51. The scanning optical system Lo2 is positioned further toward the other side in the second direction relative to the polygon mirror 51. The polygon mirror 51 is positioned between the scanning optical system Lo1 and the scanning optical system Lo2 in the second direction.

The scanning optical system Lo1 includes a scanning lens 60YM, a scanning lens 70Y, a scanning lens 70M, a reflecting mirror 81Y, a reflecting mirror 81M, and a mirror 82M. The scanning optical system Lo2 includes a scanning lens 60CK, a scanning lens 70C, a scanning lens 70K, a reflecting mirror 81C, a mirror 82C, and a reflecting mirror 81K. The components constituting the scanning optical systems Lo1 and Lo2 are fixed to the frame 100. The scanning lens 60YM is an example of the "first scanning lens", and the scanning lens 60CK is an example of the "second scanning lens". The scanning lens 70Y and the scanning lens 70M is each an example of the "third scanning lens".

The scanning lens 60YM is a lens on which the beams BY and BM deflected by the deflector 50 are configured to be incident, and the scanning lens 60CK is a lens on which the beams BC and BK deflected by the deflector 50 are configured to be incident. The scanning lenses 60YM and 60CK are configured to refract the corresponding beams BY, BM, BC, and BK deflected by the deflector 50 in the main scanning direction and to form images on the surfaces of the corresponding photosensitive drums 5A using the refracted beams BY, BM, BC, and BK. Each of the scanning lenses 60YM and 60CK has fθ characteristics that cause the corresponding beams BY, BM, BC, and BK deflected at an equal angular velocity by the deflector 50 to scan the corresponding photosensitive drums 5A at an equal velocity.

The scanning lens 60YM is positioned on the opposite side of the polygon mirror 51 from the scanning lens 60CK in the second direction. Specifically, the scanning lens 60YM is positioned further toward the one side in the second direction relative to the polygon mirror 51, and the scanning lens 60CK is positioned further toward the other side in the second direction relative to the polygon mirror 51. The scanning lens 60YM and the scanning lens 60CK are positioned so as to be symmetrical to each other with respect to a virtual plane orthogonal to the second direction and passing through the rotation axis X1 of the polygon mirror 51. The polygon mirror 51 is positioned between the scanning lens 60YM and the scanning lens 60CK in the second direction.

The reflecting mirror 81Y is a mirror configured to reflect the beam BY exiting the scanning lens 60YM toward the surface of the photosensitive drum 5AY.

The scanning lens 70Y is a lens configured to form an image on the surface of the photosensitive drum 5AY using the beam BY reflected by the reflecting mirror 81Y. The scanning lenses 70Y, 70M, 70C, and 70K are configured to refract the corresponding beams BY, BM, BC, and BK in the sub scanning direction so that images are formed on the surfaces of the corresponding photosensitive drums 5A using the refracted beams BY, BM, BC, and BK. Note that, in the scanning optical systems Lo1 and Lo2, the sub scanning direction corresponds to a direction that is orthogonal to both the main scanning direction and a direction in which the beams travel.

The mirror 82M is a mirror configured to reflect the beam BM exiting the scanning lens 60YM toward the reflecting mirror 81M. The reflecting mirror 81M is a mirror configured to reflect the beam BM toward the surface of the photosensitive drum 5AM. The scanning lens 70M is a lens configured to form an image on the surface of the photosensitive drum 5AM using the beam BM reflected by the reflecting mirror 81M.

The mirror 82C is a mirror configured to reflect the beam BC exiting the scanning lens 60CK toward the reflecting mirror 81C. The reflecting mirror 81C is a mirror configured to reflect the beam BC toward the surface of the photosensitive drum 5AC. The scanning lens 70C is a lens configured to form an image on the surface of the photosensitive drum 5AC using the beam BC reflected by the reflecting mirror 81C.

The reflecting mirror 81K is a mirror configured to reflect the beam BK exiting the scanning lens 60CK toward the surface of the photosensitive drum 5AK. The scanning lens 70K is a lens configured to form an image on the surface of the photosensitive drum 5AK using the beam BK reflected by the reflecting mirror 81K.

As illustrated in FIG. 3, the lights emitted from the light sources 10Y, 10M, 10C, and 10K are respectively converted into the beams BY, BM, BC, and BK by passing through the corresponding coupling lenses 20Y, 20M, 20C, and 20K. The beams BY, BM, BC, and BK pass through the corresponding aperture diaphragms 31Y, 31M, 31C, and 31K of the first aperture wall 30A, and then enter the condenser lens 40. The beams BY, BM, BC, and BK exiting the condenser lens 40 pass through the corresponding aperture diaphragms 32A and 32B of the second aperture wall 30B, and are incident on the polygon mirror 51.

As illustrated in FIG. 4, the polygon mirror 51 is configured to deflect the beams BY, BM, BC, and BK toward the corresponding scanning optical systems Lo1 and Lo2. The beam BY deflected toward the scanning optical system Lo1 passes through the scanning lens 60YM, reflected by the reflecting mirror 81Y, passes through the scanning lens 70Y, and is emitted toward the photosensitive drum 5AY. The beam BY is scanned in the main scanning direction to form an image on the surface of the photosensitive drum 5AY.

The beam BM deflected toward the scanning optical system Lo1 passes through the scanning lens 60YM, then reflected by the mirror 82M and the reflecting mirror 81M, passes through the scanning lens 70M, and is emitted toward the photosensitive drum 5AM. The beam BM is scanned in the main scanning direction to form an image on the surface of the photosensitive drum 5AM.

The beam BC deflected toward the scanning optical system Lo2 passes through the scanning lens 60CK, reflected by the mirror 82C and the reflecting mirror 81C, passes through the scanning lens 70C, and is emitted toward the photosensitive drum 5AC. The beam BC is scanned in the main scanning direction to form an image on the surface of the photosensitive drum 5AC.

The beam BK deflected toward the scanning optical system Lo2 passes through the scanning lens 60CK, reflected by the reflecting mirror 81K, passes through the scanning lens 70K, and is emitted toward the photosensitive drum 5AK. The beam BK is scanned in the main scanning direction to form an image on the surface of the photosensitive drum 5AK.

Figure 5:
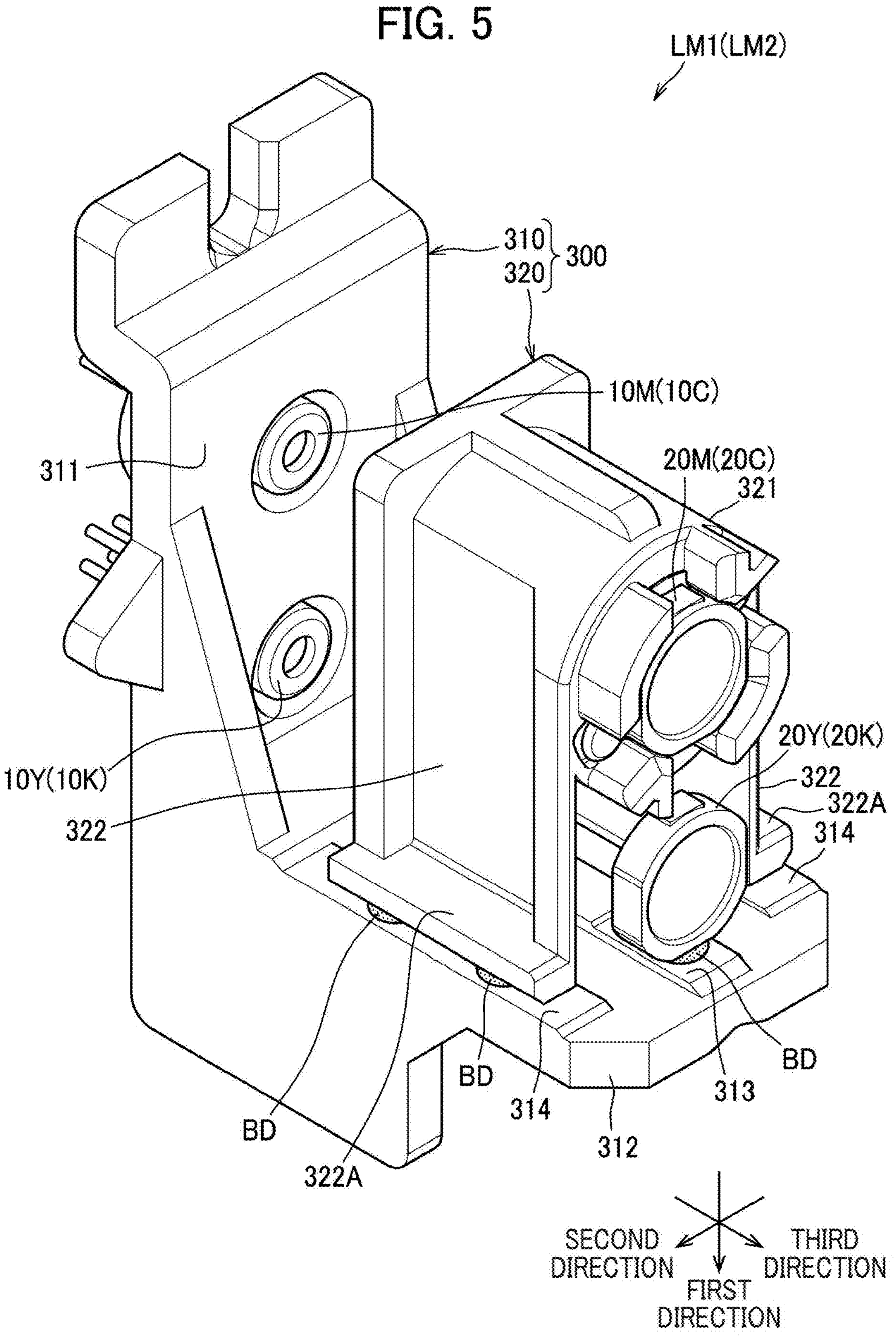
FIG. 5 is a perspective view of a light source device.

As illustrated in FIG. 5, each of the light source devices LM1 and LM2 further includes a holder 300. In the present embodiment, the light source devices LM1 and LM2 have structures substantially identical to each other. In the following description, the structure of the light source device LM1 will be described as a representative light source device. In FIG. 5, the reference numerals of the components in the light source device LM2 are shown in parentheses to correspond to those of the components in the light source device LM1.

The holder 300 holds the light sources 10Y and 10M, and the coupling lenses 20Y and 20M. The holder 300 includes a first holder 310, and a second holder 320.

The first holder 310 holds the light sources 10Y and 10M and the coupling lens 20Y. The first holder 310 includes a light source holding part 311, and a lens holding part 312.

The light source holding part 311 holds the light sources 10Y and 10M while the light sources 10Y and 10M are arranged in the first direction.

The lens holding part 312 holds the coupling lens 20Y. The lens holding part 312 extends toward the one side in the third direction from an end portion of the light source holding part 311 on the one side in the first direction. The lens holding part 312 has a first seating surface 313, and two second seating surfaces 314.

The first seating surface 313 is a surface that holds the coupling lens 20Y. The coupling lens 20Y is fixed to the first seating surface 313 with an adhesive agent BD made of photo-curable resin such as ultraviolet curable resin. The first seating surface 313 is positioned between the two second seating surfaces 314 in the second direction.

Each of the second seating surfaces 314 is a surface that holds the second holder 320. The second holder 320 is fixed to the second seating surfaces 314 with the adhesive agent BD. The light source device LM1 is fixed to the frame 100 by fixing the first holder 310 to the frame 100 by a screw SC (see FIG. 3). The same is applied with respect to the light source device LM2.

The second holder 320 holds the coupling lens 20M. The second holder 320 includes a base part 321, and two leg parts 322. The base part 321 has a tubular shape extending in the third direction. The coupling lens 20M is fixed to an end portion of the base part 321 on the one side in the third direction with an adhesive agent (not illustrated).

The two leg parts 322 extend from the base part 321 toward the one side in the first direction. Specifically, one of the two leg parts 322 extends toward the one side in the first direction from an end portion of the base part 321 on the one side in the second direction, and the other of the two leg parts 322 extends toward the one side in the first direction from an end portion of the base part 321 on the other side in the second direction. Each of the leg parts 322 includes a flange part 322A at an end portion thereof on the one side in the first direction. The flange part 322A of each of the leg parts 322 extends in a direction away from the other of the leg parts 322 in the second direction.

The second holder 320 is transparent with respect to the lights emitted from the light sources 10Y and 10M for allowing the lights emitted from the light sources 10Y and 10M to pass therethrough. For example, the second holder 320 is made of resin that is transparent with respect to the lights emitted from the light sources 10Y and 10M. The second holder 320 is fixed to the first holder 310 with the adhesive agent BD.

In order to fix the second holder 320 to the first holder 310, for example, the adhesive agent BD is applied to the second seating surfaces 314 of the first holder 310 or the flange parts 322A of the second holder 320. Next, the second holder 320 is placed on the second seating surfaces 314 of the first holder 310.

Thereafter, the adhesive agent BD is irradiated with light traveling from the other side toward the one side in the first direction through the flange parts 322A, whereby the adhesive agent BD made of photo-curable resin is cured to fix the second holder 320 to the first holder 310. The second holder 320 is also transparent with respect to light for curing the adhesive agent BD, such as ultraviolet light, to allow the light for curing the adhesive agent BD to pass therethrough.

Figure 6:
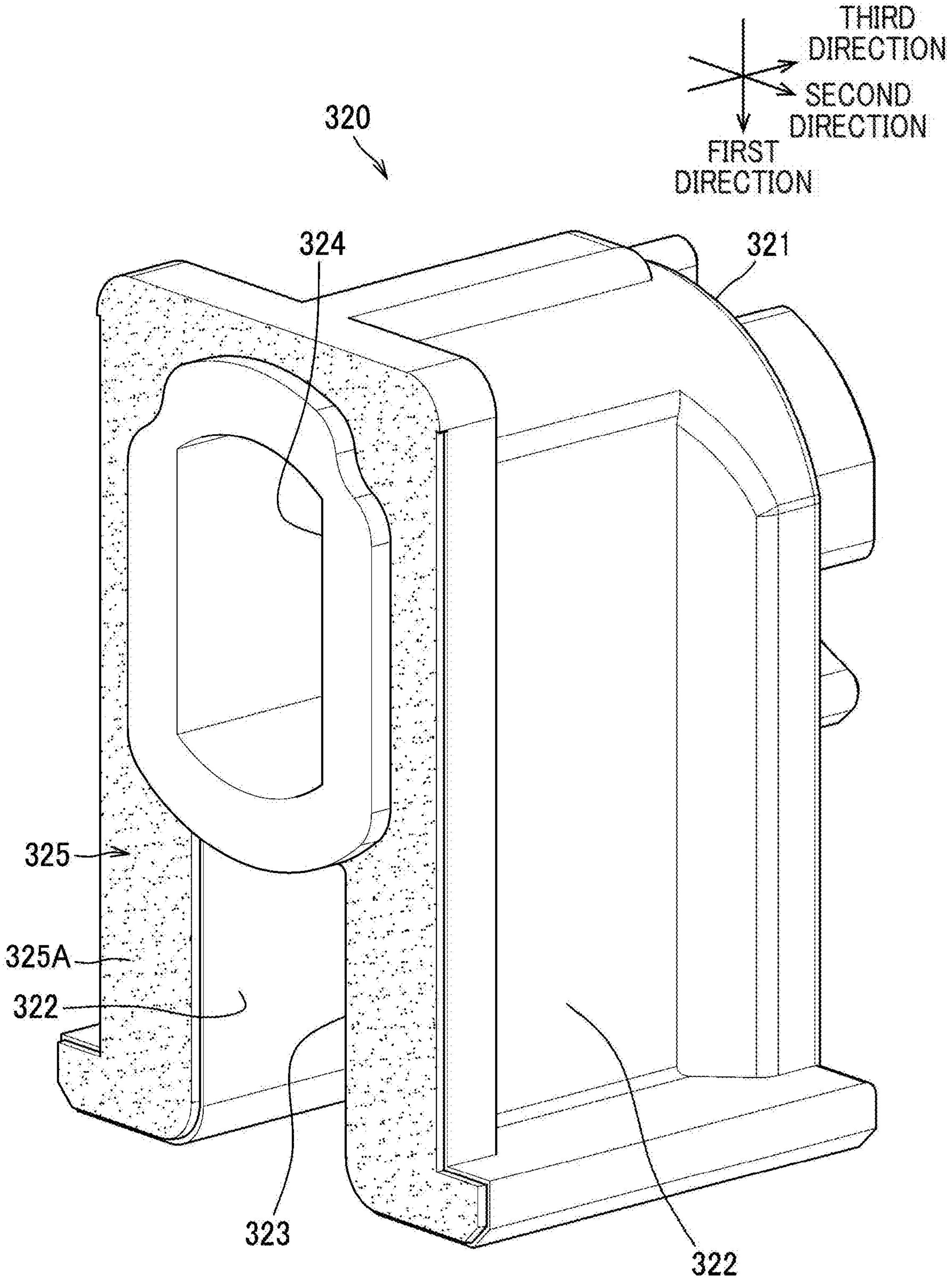
FIG. 6 is a perspective view of a second holder of the light source device.

As illustrated in FIG. 6, the second holder 320 has a recessed part 323, and a hole part 324. The recessed part 323 allows the light emitted from the light source 10Y to pass therethrough. The recessed part 323 is shaped so as to be recessed from the one side toward the other side in the first direction. The recessed part 323 is defined by the base part 321 and the two leg parts 322. The recessed part 323 is open on the second holder 320 in the third direction.

The hole part 324 allows the light emitted from the light source 10M to pass therethrough. The hole part 324 is formed in the base part 321. The hole part 324 penetrates the base part 321 in the third direction.

The second holder 320 also has an incident-side end surface 325. The incident-side end surface 325 is an end face of the second holder 320 on the side that laser beam emitted from the light sources 10Y and 10M is incident. In other words, the incident-side end surface 325 is an end surface of the second holder 320 on the other side in the third direction.

The incident-side end surface 325 includes a scattering surface 325A for scattering light. Note that dot-hatching is applied to the scattering surface 325A in FIG. 6. The scattering surface 325A is formed by embossing the incident-side end surface 325 in order to restrain reflection of light on the scattering surface 325A. The scattering surface 325A is formed by, for example, embossing a surface that forms the scattering surface 325A of a metal mold for molding the second holder 320.

Figure 7:
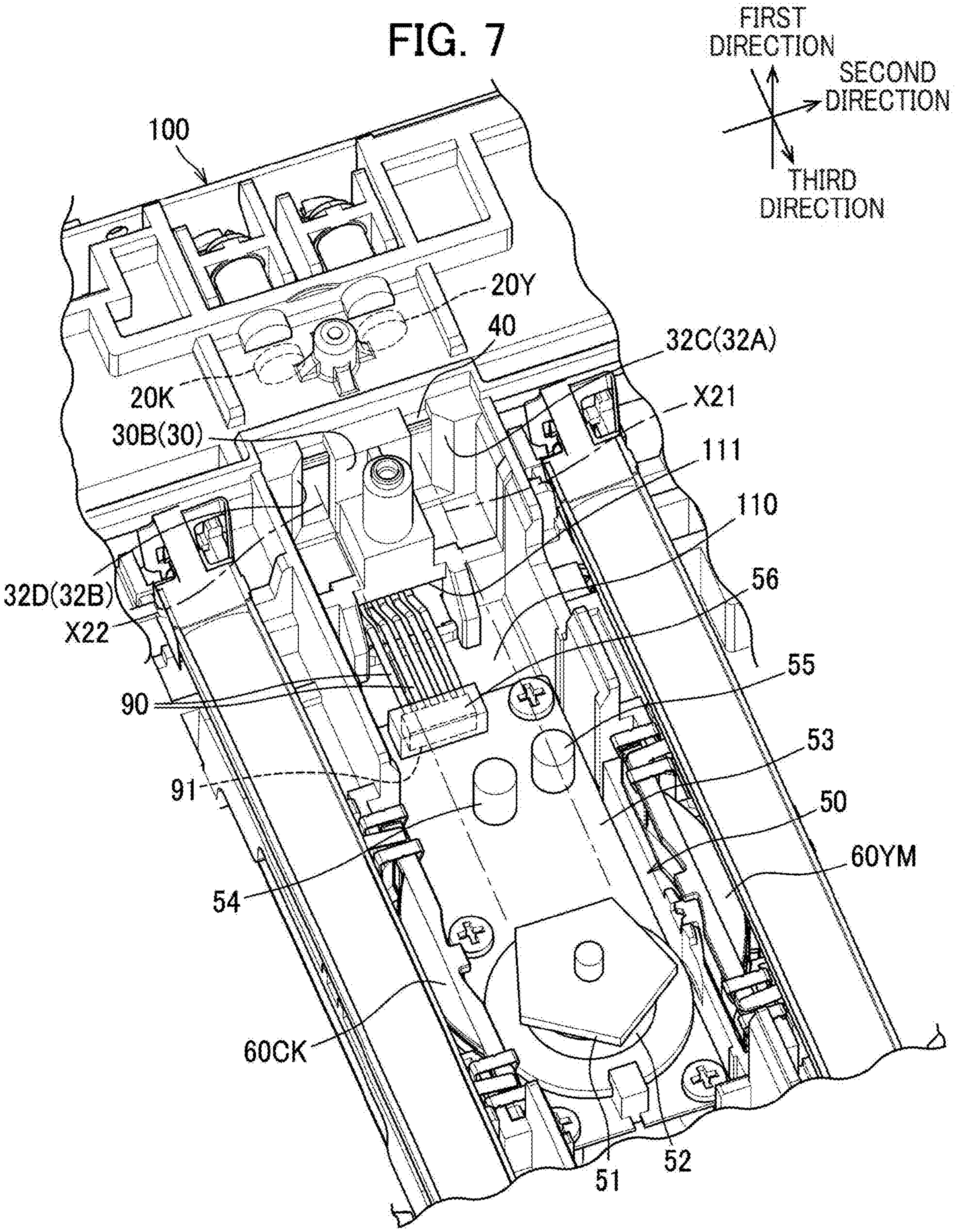
FIG. 7 is a perspective view of a second aperture wall of a frame.

As illustrated in FIG. 7, inner surfaces of the second aperture wall 30B of the frame 100 that forms the aperture diaphragm 32A includes an inclined surface 32C. Specifically, among the inner surfaces forming the aperture diaphragm 32A, an inner surface positioned on the one side in the second direction relative to the aperture diaphragm 32A serves as the inclined surface 32C. The inclined surface 32C is inclined so as to extend away from an optical axis X21 of the coupling lens 20Y as extending toward the polygon mirror 51 in the third direction.

Similarly, inner surfaces of the second aperture wall 30B that forms the aperture diaphragm 32B includes an inclined surface 32D. More specifically, among the inner surfaces forming the aperture diaphragm 32B, an inner surface positioned on the other side in the second direction relative to the aperture diaphragm 32B serves as the inclined surface 32D. The inclined surface 32D is inclined so as to extend away from an optical axis X22 of the coupling lens 20K as extending toward the polygon mirror 51 in the third direction.

Figure 8:
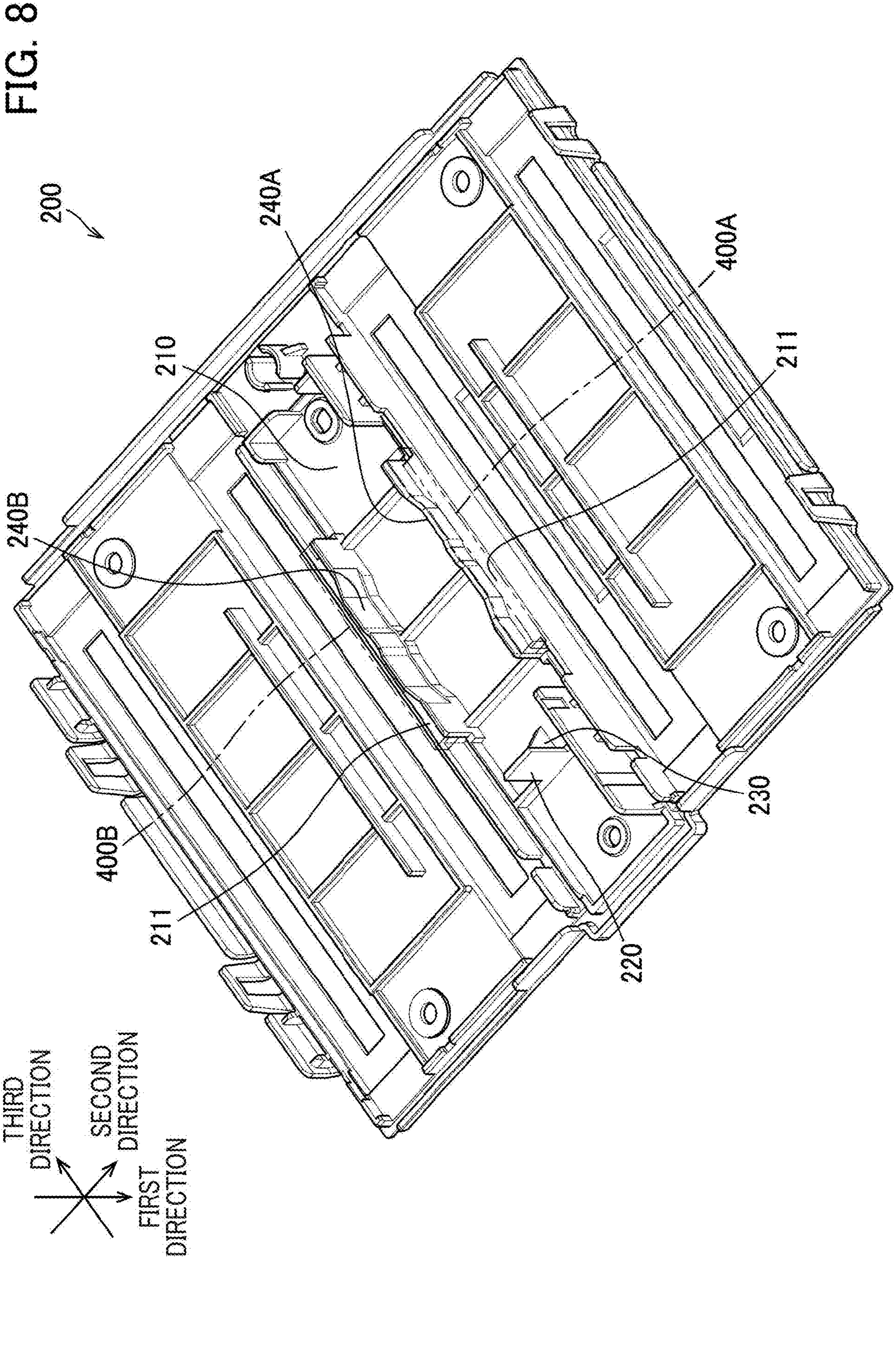
FIG. 8 is a perspective view of a cover.

As illustrated in FIG. 8, the cover 200 further includes a light-shielding wall 220, a reinforcing wall 230, and first light-shielding walls 240A and 240B. The light-shielding wall 220, the reinforcing wall 230, and the first light-shielding walls 240A and 240B extend toward the other side in the first direction from the cover base wall 210. The first light-shielding walls 240A and 240B extend in the third direction.

Figure 9:
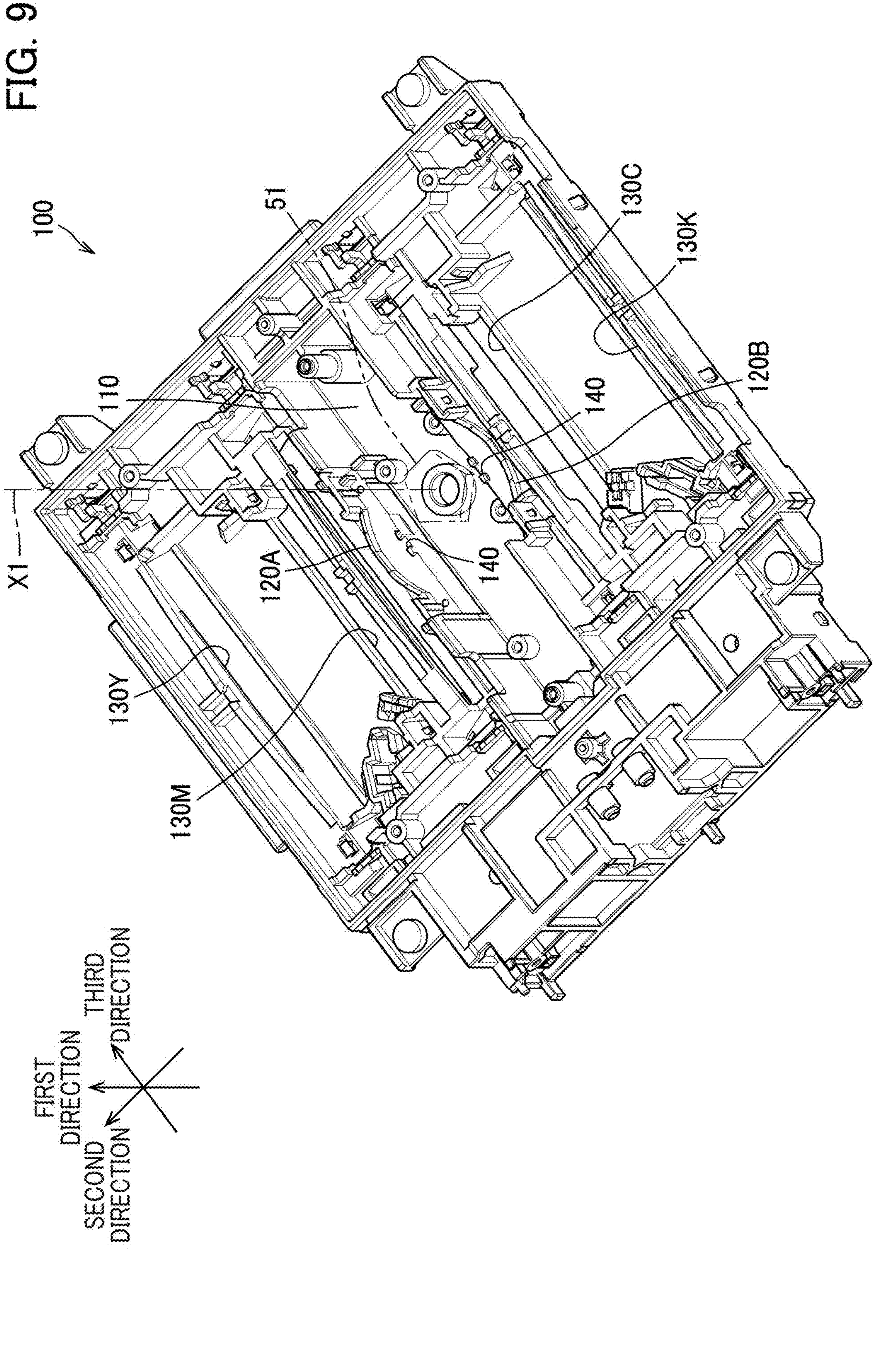
FIG. 9 is a perspective view of the frame.

As illustrated in FIG. 9, the frame 100 further includes second light-shielding walls 120A and 120B and third light-shielding walls 130Y, 130M, 130C, and 130K (see also FIG. 4), and has two recessed parts 140. The second light-shielding walls 120A and 120B extend toward the one side in the first direction from the frame base wall 110. The second light-shielding walls 120A and 120B and the third light-shielding walls 130Y, 130M, 130C, and 130K extend in the third direction.

One of the two recessed parts 140 is positioned between the polygon mirror 51 and the second light-shielding wall 120A in the second direction. The other of the two recessed parts 140 is positioned between the polygon mirror 51 and the second light-shielding wall 120B in the second direction. The recessed parts 140 are parts in which protruding parts 63 (described later) of the corresponding scanning lenses 60YM and 60CK are fitted.

Figure 10A:
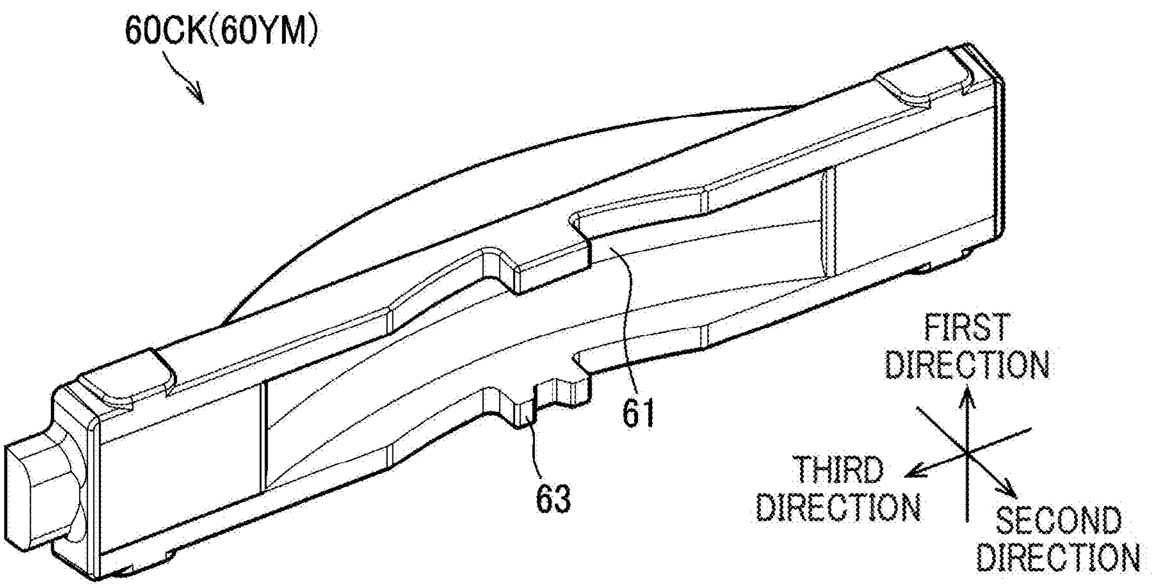
FIG. 10A is a perspective view of a scanning lens that has fθ characteristics.
Figure 10B:
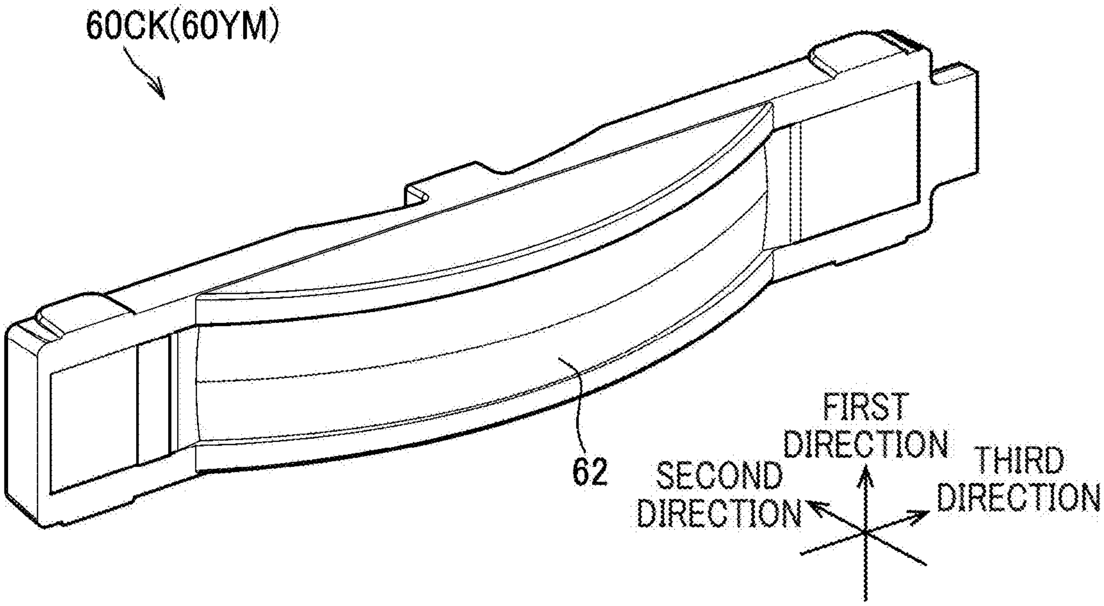
FIG. 10B is another perspective view of the scanning lens.

In the present embodiment, the scanning lenses 60YM and 60CK have structures substantially the same as each other. Accordingly, hereinafter, the structure of the scanning lens 60CK will be described with reference to FIGS. 10A and 10B as a representative component. The scanning lens 60CK has an incident surface 61 and an emitting surface 62 opposite the incident surface 61, and the protruding part 63.

The incident surface 61 of the scanning lens 60CK is a curved concave surface whose center in the third direction is recessed toward the other side in the second direction. The emitting surface 62 of the scanning lens 60CK is a curved convex surface whose center in the third direction protrudes toward the other side in the second direction.

The protruding part 63 of the scanning lens 60CK protrudes toward the one side in the second direction from a center in the third direction of the scanning lens 60CK. In other words, the protruding part 63 protrudes toward the polygon mirror 51 from the center in the third direction of the scanning lens 60CK.

The scanning lenses 60YM and 60CK are fixed to the frame 100 while the protruding parts 63 are fitted in the corresponding recessed parts 140 (see FIG. 9) of the frame 100. The fitting engagement of the protruding parts 63 in the corresponding recessed parts 140 position the scanning lenses 60YM and 60CK relative to the frame 100.

Figure 11:
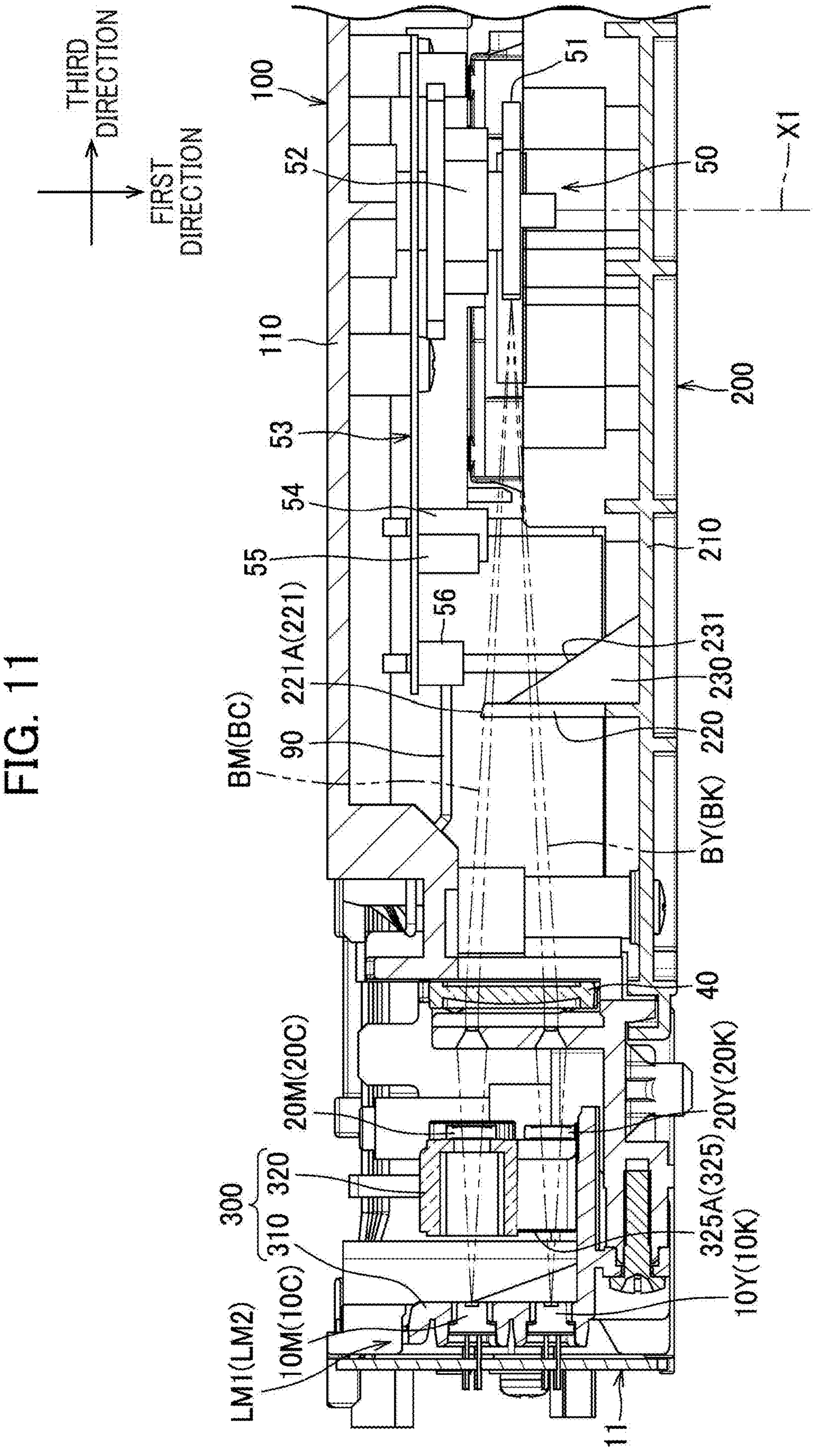
FIG. 11 is an enlarged cross-sectional view illustrating a light-shielding wall and a reinforcing wall.

As illustrated in FIG. 11, the light-shielding wall 220 extends toward the frame base wall 110 from the cover base wall 210. The light-shielding wall 220 extends to a position closer to the frame base wall 110 than the polygon mirror 51 is to the frame base wall 110 in the first direction.

The light-shielding wall 220 is positioned between the polygon mirror 51 and the coupling lenses 20Y, 20M, 20C, and 20K in the third direction. Specifically, the light-shielding wall 220 is positioned between the condenser lens 40 and the polygon mirror 51 in the third direction.

The light-shielding wall 220 has a first end surface 221, which is an end surface of the light-shielding wall 220 that is close to the frame base wall 110. More specifically, the first end surface 221 is an end surface of the light-shielding wall 220 on the other side in the first direction. The first end surface 221 includes an inclined surface 221A. The inclined surface 221A is inclined so as to approach the cover base wall 210 as extending toward the polygon mirror 51 in the third direction.

In the present embodiment, the first end surface 221 of the light-shielding wall 220 is positioned between the polygon mirror 51 and the board 53 of the deflector 50 in the first direction. In other words, the light-shielding wall 220 does not extend to a position of the board 53 in the first direction in the present embodiment.

Similar to the light-shielding wall 220, the reinforcing wall 230 extends toward the frame base wall 110 from the cover base wall 210. Further, the reinforcing wall 230 is formed integrally with the light-shielding wall 220, and extends from the light-shielding wall 220 toward the polygon mirror 51. The reinforcing wall 230 has an end surface 231 that is inclined so as to approach the cover base wall 210 as extending toward the polygon mirror 51 in the third direction.

The deflector 50 further includes a first capacitor 54, and a second capacitor 55 (see also FIG. 7) in addition to the polygon mirror 51, the motor 52, and the board 53. The first capacitor 54, the second capacitor 55, and the motor 52 are mounted on the board 53. More specifically, the first capacitor 54, the second capacitor 55, and the motor 52 protrude toward the cover base wall 210 from the board 53.

Each of the first capacitor 54 and the second capacitor 55 is an electronic component having a solid cylindrical shape and constituting a driving circuit of the motor 52. The first capacitor 54 and the second capacitor 55 are positioned between the light-shielding wall 220 and the polygon mirror 51 in the third direction. The light-shielding wall 220 overlaps with the first capacitor 54 when viewed in the third direction. Specifically, when viewed in the third direction, an end portion of the light-shielding wall 220 on the other side in the first direction overlaps with an end portion of the first capacitor 54 on the one side in the first direction.

Figure 12:
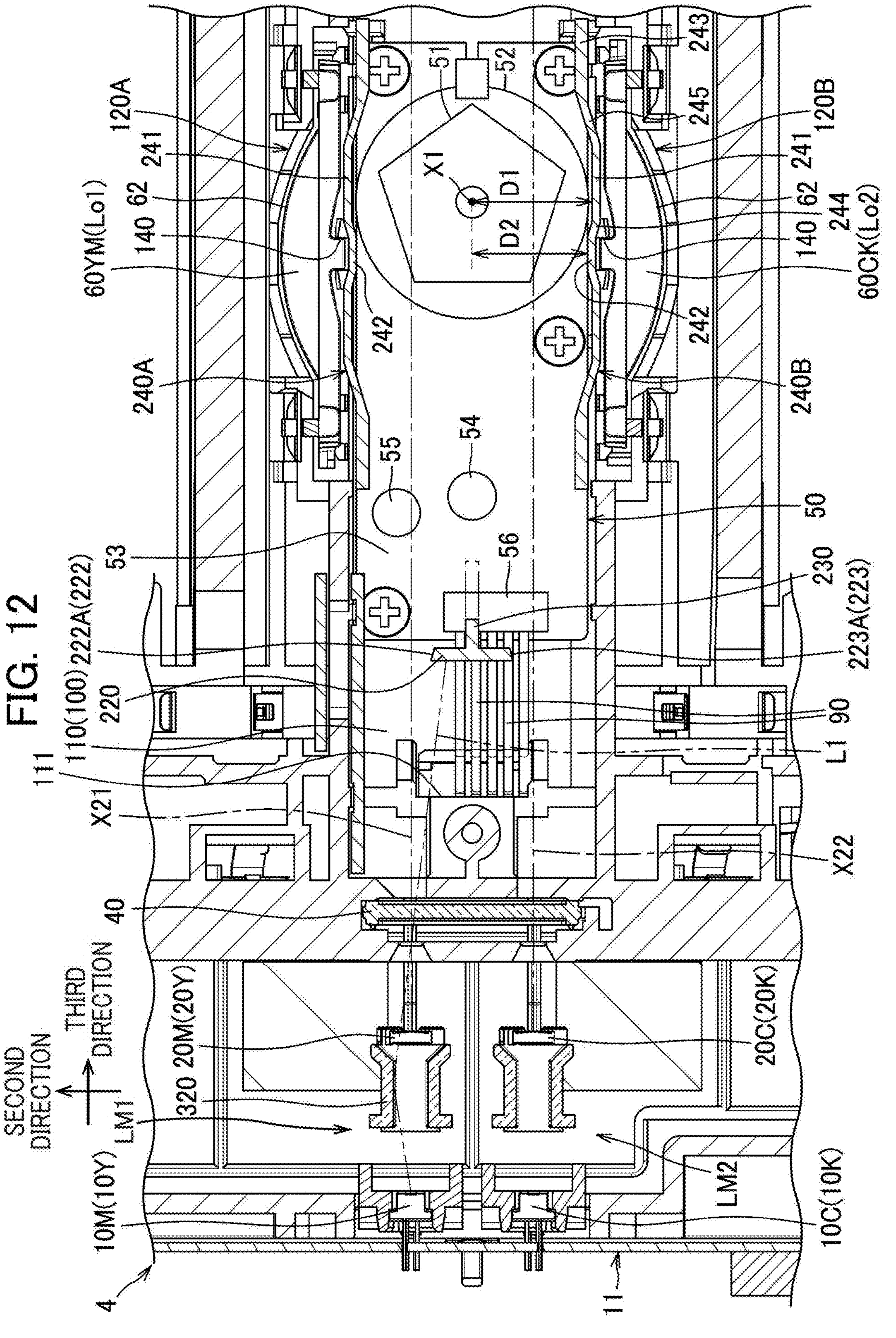
FIG. 12 is a view illustrating the light-shielding wall, first light-shielding walls, and second light-shielding walls as viewed from one side in a first direction.

As illustrated in FIG. 12, the light-shielding wall 220, the reinforcing wall 230, and the first capacitor 54 are positioned between the optical axis X21 of the coupling lens 20Y and the optical axis X22 of the coupling lens 20K in the second direction. The second capacitor 55 overlaps with the optical axis X21 of the coupling lens 20Y when viewed in the first direction. The beams BY and BM exiting the condenser lens 40 and traveling toward the polygon mirror 51 pass through a portion positioned further toward the one side in the first direction relative to the second capacitor 55, as illustrated in FIG. 11.

The light-shielding wall 220 also has a second end surface 222, and a third end surface 223. The second end surface 222 and the third end surface 223 are end surfaces of the light-shielding wall 220 in the second direction. More specifically, the second end surface 222 is an end surface of the light-shielding wall 220 on the one side in the second direction, while the third end surface 223 is an end surface of the light-shielding wall 220 on the other side in the second direction.

The second end surface 222 includes an inclined surface 222A, and the third end surface 223 includes an inclined surface 223A. The inclined surface 222A and the inclined surface 223A are inclined so as to respectively extend away from the optical axis X21 of the coupling lens 20Y or the optical axis X22 of the coupling lens 20K, which is closer, as extending toward the polygon mirror 51 in the third direction.

More specifically, the inclined surface 222A is inclined so as to extend away from the optical axis X21 as approaching the polygon mirror 51 in the third direction. The inclined surface 223A is inclined so as to extend away from the optical axis X22 as approaching the polygon mirror 51 in the third direction.

The scanning optical device 4 further includes cables 90 through which signals are transmitted from a laser circuit board 11 to the board 53 of the deflector 50. The laser circuit board 11 is configured to receive signals from a main circuit board (not illustrated) in the image forming apparatus 1. The light sources 10Y, 10M, 10C, and 10K are mounted on the laser circuit board 11.

As illustrated in FIG. 7, each of the cables 90 has one end connected to the board 53. Specifically, the cables 90 include a first connector 91 at one end thereof. The first connector 91 is connected to a board connector 56. The board connector 56 is mounted on an end portion of the board 53 on the other side in the third direction.

As illustrated in FIG. 2, each of the cables 90 also has another end connected to the laser circuit board 11. Specifically, the cables 90 also include a second connector 92 at the other end thereof. The second connector 92 is connected to a connector 12 mounted on the laser circuit board 11.

As illustrated in FIG. 12, the cables 90 extend toward the other side in the third direction from the deflector 50. The cables 90 extend from the deflector 50 to an outside of the frame 100 through an opening 111 (see also FIG. 2) formed in the frame 100.

The light-shielding wall 220 overlaps with a part of the cables 90 when viewed in the first direction. The light-shielding wall 220 faces a part of the cables 90 in the first direction (see also FIG. 11).

The light-shielding wall 220 does not overlap with the board 53 when viewed in the first direction. Specifically, the light-shielding wall 220 is positioned closer to the coupling lenses 20Y, 20M, 20C, and 20K than the board 53 is to the coupling lenses 20Y, 20M, 20C, and 20K in the third direction. More specifically, the light-shielding wall 220 is positioned further toward the other side in the third direction relative to the board 53. The light-shielding wall 220 is positioned between the condenser lens 40 and the board 53 in the third direction.

The reinforcing wall 230 overlaps with the board 53 when viewed in the first direction. The reinforcing wall 230 faces the board 53 in the first direction. The reinforcing wall 230 is positioned further toward the one side in the first direction relative to the board 53 (see also FIG. 11). In the present embodiment, the reinforcing wall 230 also overlaps with the board connector 56 when viewed in the first direction.

The first light-shielding wall 240A is positioned between the polygon mirror 51 and the scanning lens 60YM in the second direction. The first light-shielding wall 240B is positioned between the polygon mirror 51 and the scanning lens 60CK in the second direction.

The second light-shielding wall 120A is positioned on the side that the emitting surface 62 of the scanning lens 60YM is provided in the second direction. In other words, the second light-shielding wall 120A is positioned further toward the one side in the second direction relative to the scanning lens 60YM. Further in other words, the second light-shielding wall 120A is positioned closer to the emitting surface 62 of the scanning lens 60YM than to the incident surface 61 of the scanning lens 60YM.

The second light-shielding wall 120B is positioned on the side that the emitting surface 62 of the scanning lens 60CK is provided in the second direction. In other words, the second light-shielding wall 120B is positioned further toward the other side in the second direction relative to the scanning lens 60CK. Further in other words, the second light-shielding wall 120B is positioned closer to the emitting surface 62 of the scanning lens 60CK than to the incident surface 61 of the scanning lens 60CK.

In the present embodiment, the first light-shielding wall 240A and components in the vicinity thereof, and the first light-shielding wall 240B and components in the vicinity thereof are symmetrical to each other with respect to the virtual plane orthogonal to the second direction and passing through the rotation axis X1 of the polygon mirror 51. Further, the second light-shielding wall 120A and components in the vicinity thereof, and the second light-shielding wall 120B and components in the vicinity thereof are symmetrical to each other with respect to the virtual plane orthogonal to the second direction and passing through the rotation axis X1 of the polygon mirror 51. In the following description, the structures of the first light-shielding wall 240B and the components in the vicinity thereof, and the structures of the second light-shielding wall 120B and the components in the vicinity thereof will be described as representative components.

The first light-shielding wall 240B has such a shape that, when viewed in the first direction, the first light-shielding wall 240B is bent so as to separate from the rotation axis X1 of the polygon mirror 51 in the second direction. In other words, when viewed in the first direction, the first light-shielding wall 240B has a recessed portion recessed away from the rotation axis X1 of the polygon mirror 51 in the second direction. More specifically, the first light-shielding wall 240B has a first part 241, a second part 242, a third part 243, a fourth part 244, and a fifth part 245.

The first part 241, the second part 242, and the third part 243 extend in the third direction. The first part 241 faces the rotation axis X1 of the polygon mirror 51 in the second direction.

The second part 242 is positioned further toward the other side in the third direction relative to the first part 241. The second part 242 is positioned closer to the first light-shielding wall 240A than the first part 241 is to the first light-shielding wall 240A in the second direction. The second part 242 faces the center in the third direction of the scanning lens 60CK in the second direction. Specifically, the second part 242 faces the protruding part 63 (see FIG. 10A) of the scanning lens 60CK in the second direction.

The third part 243 is positioned further toward the one side in the third direction relative to the first part 241. The third part 243 is positioned closer to the first light-shielding wall 240A than the first part 241 and the second part 242 are to the first light-shielding wall 240A in the second direction.

The fourth part 244 connects the first part 241 and the second part 242 to each other. The fourth part 244 extends to be inclined relative to the third direction so that the fourth part 244 extends toward the first light-shielding wall 240A as extending toward the second part 242.

The fifth part 245 connects the first part 241 and the third part 243 to each other. The fifth part 245 extends to be inclined relative to the third direction so that the fifth part 245 extends toward first light-shielding wall 240A as extending toward the third part 243.

A distance D1 from the rotation axis X1 of the polygon mirror 51 to the first part 241 in the second direction is greater than a distance D2 from the rotation axis X1 of the polygon mirror 51 to the second part 242 in the second direction. The first light-shielding wall 240B has a symmetrical structure in the third direction with respect to a center in the third direction of the second part 242. The first light-shielding wall 240B as a whole has a generally such a shape that the first light-shielding wall 240B is bent so as to extend away from the rotation axis X1 of the polygon mirror 51 in the second direction.

The second light-shielding wall 120B has a shape in conformance with the emitting surface 62 of the scanning lens 60CK when viewed in the first direction. Specifically, the second light-shielding wall 120B has a bow-like shape in such a manner that a center in the third direction of the second light-shielding wall 120B protrudes toward the other side in the second direction when viewed in the first direction.

Figure 13:
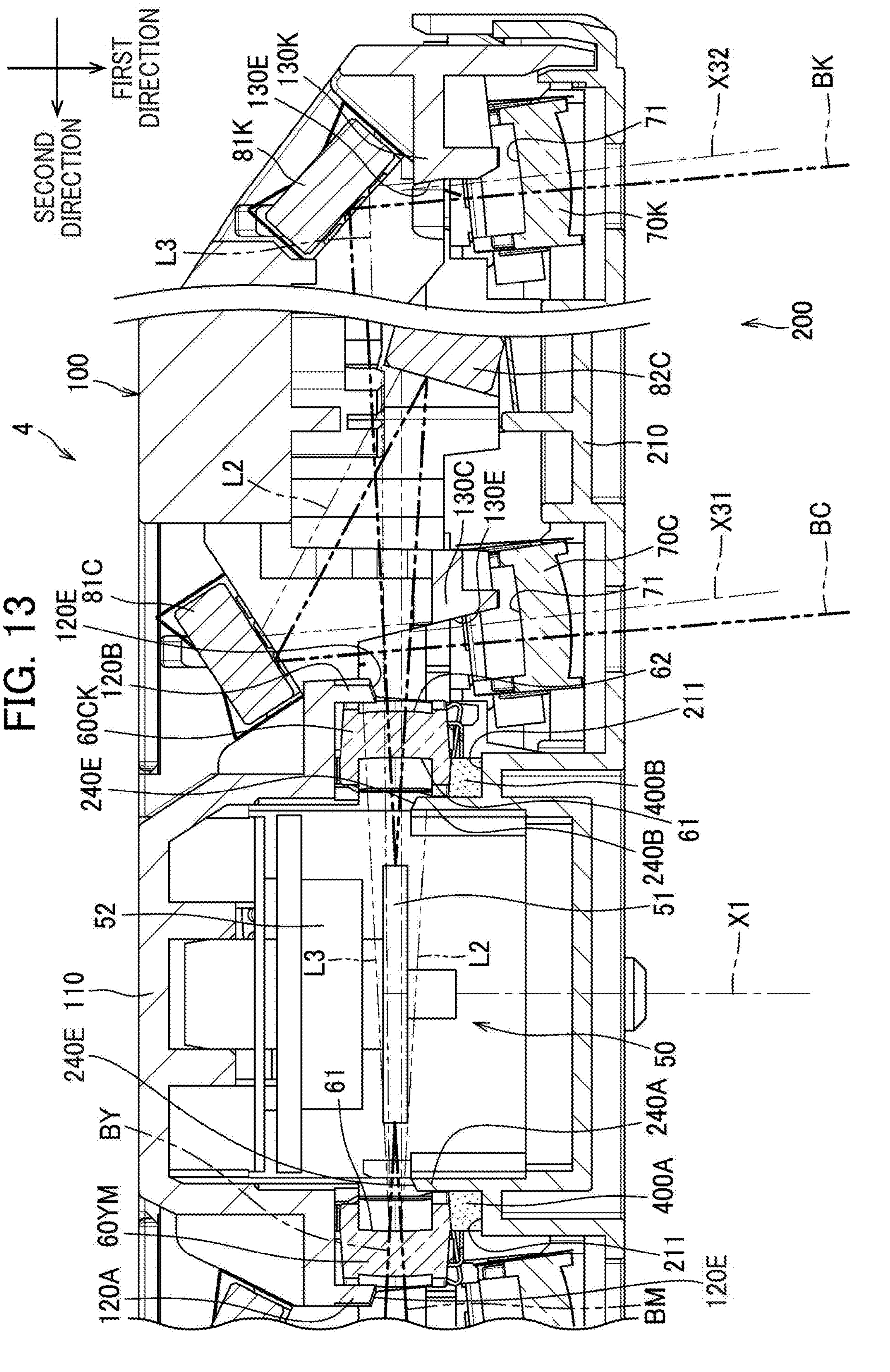
FIG. 13 is an enlarged cross-sectional view illustrating the first light-shielding walls, the second light-shielding walls, and third light-shielding walls.

As illustrated in FIG. 13, the first light-shielding wall 240B extends toward the frame base wall 110 from the cover base wall 210. The first light-shielding wall 240B has an end surface 240E. The end surface 240E is an end surface of the first light-shielding wall 240B that is close to the frame base wall 110. The end surface 240E of the first light-shielding wall 240B is closer to the cover base wall 210 than the polygon mirror 51 is to the cover base wall 210 in the first direction. That is, the first light-shielding wall 240B does not extend to a position between the polygon mirror 51 and the incident surface 61 of the scanning lens 60CK in the first direction. The end surface 240E is an example of the "first end surface".

The first light-shielding wall 240B extends in the first direction to a position of an end portion of the incident surface 61 on the one side in the first direction. Hence, the first light-shielding wall 240B overlaps with the incident surface 61 of the scanning lens 60CK when viewed in the second direction. The end surface 240E of the first light-shielding wall 240B is inclined so as to approach the cover base wall 210 as extending toward the scanning lens 60CK in the second direction.

The second light-shielding wall 120B extends toward the cover base wall 210 from the frame base wall 110. The second light-shielding wall 120B has an end surface 120E. The end surface 120E is an end surface of the second light-shielding wall 120B that is close to the cover base wall 210. The end surface 120E of the second light-shielding wall 120B is closer to the frame base wall 110 than the polygon mirror 51 is to the frame base wall 110 in the first direction. That is, the second light-shielding wall 120B does not extend to a position of the polygon mirror 51 in the first direction. The end surface 120E is an example of the "second end surface".

The second light-shielding wall 120B extends in the first direction to a position of an end portion of the emitting surface 62 of the scanning lens 60CK on the other side in the first direction. Hence, the second light-shielding wall 120B overlaps with the emitting surface 62 of the scanning lens 60CK when viewed in the second direction. The end surface 120E of the second light-shielding wall 120B is inclined so as to approach the frame base wall 110 as extending away from the scanning lens 60CK in the second direction.

Next, the third light-shielding walls 130Y, 130M, 130C, and 130K will be described with reference to FIGS. 4 and 13. In the present embodiment, the third light-shielding walls 130Y and 130M and components in the vicinity thereof are substantially symmetrical to the third light-shielding walls 130C and 130K and components in the vicinity thereof with respect to the imaginary plane orthogonal to the second direction and passing through the rotation axis X1 of the polygon mirror 51. In the following description, the structures of the third light-shielding walls 130C and 130K, and the components in the vicinity thereof will be described as representative components.

The third light-shielding wall 130C is positioned between the reflecting mirror 81C and the scanning lens 70C. Specifically, the third light-shielding wall 130C is positioned between the reflecting mirror 81C and the scanning lens 70C in the first direction. Further, the third light-shielding wall 130C is positioned between the reflecting mirror 81C and the scanning lens 70C in the second direction. Further, the third light-shielding wall 130C is positioned between the reflecting mirror 81C and the scanning lens 70C in the third direction. The third light-shielding wall 130C overlaps with an incident surface 71 of the scanning lens 70C when viewed in the first direction.

The third light-shielding wall 130C is positioned on the opposite side of an optical axis X31 of the scanning lens 70C from the polygon mirror 51 in the second direction. In other words, the optical axis X31 of the scanning lens 70C is positioned between the polygon mirror 51 and the third light-shielding wall 130C in the second direction.

The third light-shielding wall 130C has an end surface 130E. The end surface 130E is an end surface of the third light-shielding wall 130C that is close to the optical axis X31 of the scanning lens 70C. The end surface 130E is inclined so as to extend away from the optical axis X31 of the scanning lens 70C as extending toward the scanning lens 70C.

The third light-shielding wall 130K is positioned between the reflecting mirror 81K and the scanning lens 70K. Specifically, the third light-shielding wall 130K is positioned between the reflecting mirror 81K and the scanning lens 70K in the first direction. Further, the third light-shielding wall 130K is positioned between the reflecting mirror 81K and the scanning lens 70K in the second direction. Further, the third light-shielding wall 130K is positioned between the reflecting mirror 81K and the scanning lens 70K in the third direction. The third light-shielding wall 130K overlaps with an incident surface 71 of the scanning lens 70K when viewed in the first direction.

The third light-shielding wall 130K is positioned on the opposite side of an optical axis X32 of the scanning lens 70K from the polygon mirror 51 in the second direction. In other words, the optical axis X32 of the scanning lens 70K is positioned between the polygon mirror 51 and the third light-shielding wall 130K in the second direction.

The third light-shielding wall 130K has an end surface 130E. The end surface 130E is an end surface of the third light-shielding wall 130K that is close to the optical axis X32 of the scanning lens 70K. The end surface 130E of the third light-shielding wall 130K is inclined so as to extend away from the optical axis X32 of the scanning lens 70K as extending toward the scanning lens 70K.

The scanning optical device 4 further includes two elastic members 400A and 400B. The elastic member 400A is a component that seals a gap between the first light-shielding wall 240A and the scanning lens 60YM. The elastic member 400B is a component that seals a gap between the first light-shielding wall 240B and the scanning lens 60CK. The elastic members 400A and 400B are made of, for example, sponge.

In the present embodiment, the elastic member 400A and components in the vicinity thereof are substantially symmetrical to the elastic member 400B and components in the vicinity thereof with respect to the imaginary plane orthogonal to the second direction and passing through the rotation axis X1 of the polygon mirror 51. In the following description, the structures of the elastic member 400B and the components in the vicinity thereof will be described as representative components.

The elastic member 400B is positioned between the cover 200 and the scanning lens 60CK. Specifically, the elastic member 400B is positioned between the cover base wall 210 and the scanning lens 60CK.

More specifically, the cover base wall 210 has a seating surface 211. The elastic member 400B is interposed between the seating surface 211 and the scanning lens 60CK. The seating surface 211 a surface that is substantially orthogonal to the first direction. The seating surface 211 extends away from the rotational axis X1 of the polygon mirror 51 in the second direction from an end portion of the first light-shielding wall 240B on the one side in the first direction. The seating surface 211 is elongated in the third direction.

The elastic member 400B is fixed to the seating surface 211 with double-sided adhesive tape or adhesive agent. The elastic member 400B has an elongated shape in the third direction as illustrated in FIG. 8. The elastic member 400B is placed while the elastic member 400B is positioned close to the first light-shielding wall 240B. A surface of the elastic member 400B that faces the first light-shielding wall 240B has a shape in conformance with that of the first light-shielding wall 240B. In the present embodiment, the elastic member 400B has a length in the third direction approximately equal to a length of the first light-shielding wall 240B in the third direction.

The elastic member 400B is interposed between the scanning lens 60CK and the seating surface 211 while the elastic member 400B is elastically deformed by assembling the frame 100 to which the scanning lens 60CK is fixed and the cover 200 to which the elastic member 400B is fixed together. The elastic member 400B seals a gap between the first light-shielding wall 240B and the scanning lens 60CK from the one side in the first direction.

Next, advantageous effects according to the present embodiment will be described.

As illustrated in FIG. 12, in the scanning optical device 4, the light emitted from the light source 10Y may be reflected on an inner surface of the second holder 320, walls in the frame 100 and the like, and may become stray light L1, for example. In a case where the stray light L1 is deflected by the polygon mirror 51 and passes through the scanning optical system Lo2 to reach the surface of the photosensitive drum 5AK, a ghost may be formed in an image formed on the sheet S.

In the present embodiment, since the light-shielding wall 220 is provided in the scanning optical device 4, the stray light L1 passing through a portion between optical axis X21 of the coupling lens 20Y and the optical axis X22 of the coupling lens 20K can be shielded using the light-shielding wall 220.

Further, as illustrated in FIG. 11, since the light-shielding wall 220 is provided in the cover 200, the light-shielding wall 220 is unlikely to interfere with the deflector 50 in comparison with a structure in which the light-shielding wall 220 is provided in the frame 100 in which the deflector 50 is mounted. Therefore, a degree of freedom in arrangement of the light-shielding wall 220 can be improved, whereby the light-shielding wall 220 can be placed at a position for effectively shielding stray lights.

Further, the light-shielding wall 220 extends to the position closer to the frame base wall 110 than the polygon mirror 51 is to the frame base wall 110 in the first direction. This structure can retrain the stray light from reaching the polygon mirror 51 after passing through a portion between the light-shielding wall 220 and the frame base wall 110.

In the scanning optical device 4, the beams BY, BM, BC, and BK exiting the four coupling lenses 20, which are arranged in the first direction and in the second direction, are deflected by the deflector 50 and images are formed on the photosensitive drums 5A using the beams BY, BM, BC, and BK in the corresponding scanning optical systems Lo1 and Lo2. With this structure, a plurality of stray lights derived from the lights from the four light sources 10 can be effectively shielded using the single light-shielding wall 220.

Further, since the condenser lens 40 is configured to refract the beams BM and BC toward the cover base wall 210 in the first direction, the condenser lens 40 can also refract stray lights derived from the lights from the light sources 10M and 10C toward the cover base wall 210 in the first direction. Further, since the light-shielding wall 220 is positioned between the condenser lens 40 and the polygon mirror 51 in the third direction, the light-shielding wall 220 can still shield stray lights derived from the lights emitted from the light sources 10M and 10C even if a dimension of the light-shielding wall 220 in the first direction is reduced. In other words, the light-shielding wall 220 can have a reduced size in the first direction.

Since the scanning optical device 4 includes the reinforcing wall 230, the light-shielding wall 220 can be reinforced by the reinforcing wall 230. Also, since the reinforcing wall 230 extending from the light-shielding wall 220 overlaps with the board 53 of the deflector 50 when viewed in the first direction, the light-shielding wall 220 can be disposed at a position close to the board 53, thereby restraining stray light from passing through a portion between the light-shielding wall 220 and the board 53 and from reaching the polygon mirror 51.

Further, the first capacitor 54 protruding toward the cover base wall 210 is positioned between the light-shielding wall 220 and the polygon mirror 51 in the third direction, and is positioned between the optical axis X21 of the coupling lens 20Y and the optical axis X22 of the coupling lens 20K in the second direction. With this arrangement, the first capacitor 54 can block stray light passing through a portion between the optical axis X21 and the optical axis X22.

Further, the light-shielding wall 220 overlaps with the first capacitor 54 when viewed in the third direction. This structure can restrain stray light from reaching the polygon mirror 51 by passing through a portion between the light-shielding wall 220 and the first capacitor 54.

Further, the light-shielding wall 220 overlaps with a part of the cables 90 when viewed in the first direction. Hence, displacement of the cables 90 can be restrained using the light-shielding wall 220 when the cables 90 move toward the light-shielding wall 220.

Further, the first, second, and third end surfaces 221, 222, and 223 of the light-shielding wall 220 include the inclined surfaces 221A, 222A, and 223A, respectively. These inclined surfaces 221A, 222A, and 223A can restrain the lights proceeding from the light sources 10 from becoming stray lights due to reflection of the lights on the first, second, and third end surfaces 221, 222, and 223.

Further, since the incident-side end surface 325 of each of the second holders 320 includes the scattering surface 325A, the light entering the holder 300 (i.e., the second holder 320) from becoming stray light due to internal reflection of the light on the incident-side end surface 325 of the second holder 320.

Further, as illustrated in FIG. 7, the inner surfaces of the second aperture wall 30B that form the aperture diaphragms 32A and 32B respectively include the inclined surfaces 32C and 32D. The inclined surfaces 32C and 32D can restrain the lights proceeding from the light sources 10 from becoming stray lights due to internal reflection of the lights on the inner surfaces forming the aperture diaphragms 32A and 32B.

Further, in the scanning optical device 4, the beam BM deflected by the deflector 50 may happen to become a stray light L2 due to reflection of the beam BM on the incident surface 61 of the scanning lens 60YM, as illustrated in FIG. 13. Similarly, the beam BY deflected by the deflector 50 may happen to become a stray light L3 due to reflection of the beam BY on the incident surface 61 of the scanning lens 60YM. In a case where the stray light L2 passes through the scanning optical system Lo2 and reaches the surface of the photosensitive drum 5AC, and/or the stray light L3 passes through the scanning optical system Lo2 and reaches the surface of the photosensitive drum 5AK, a ghost may be formed in an image formed on the sheet S.

Because of the presence of the first light-shielding wall 240B in the present embodiment, the stray light L2 can be shielded using the first light-shielding wall 240B. Also, because of the presence of the second light-shielding wall 120B, the stray light L3 can be shielded using the second light-shielding wall 120B.

Similarly, because of the presence of the first light-shielding wall 240A, the stray light, which is the beam BC reflected by the incident surface 61 of the scanning lens 60CK, can be shielded using the first light-shielding wall 240A. Further, because of the presence of the second light-shielding wall 120A, the stray light, which is the beam BK reflected by the incident surface 61 of the scanning lens 60CK, can be shielded using the second light-shielding wall 120A.

Further, in the present embodiment, the second light-shielding walls 120A and 120B, which extend from the frame base wall 110 on which the deflector 50 is mounted, are positioned on the side of the emitting surfaces 62 of the corresponding scanning lenses 60YM and 60CK. With this arrangement, the distances from the polygon mirror 51 to the second light-shielding walls 120A and 120B can be sufficiently ensured, thereby restraining generation of noise due to the rotation of the polygon mirror 51.

Because of the presence of the third light-shielding wall 130C, the stray light L2 that is not shielded by the first light-shielding wall 240B can be shielded using the third light-shielding wall 130C. Also, because of the presence of the third light-shielding wall 130K, the stray light L3 that is not shielded by the second light-shielding wall 120B can be shielded using the third light-shielding wall 130K.

Similarly, because of the presence of the third light-shielding wall 130M, the stray light derived from the beam BC and not shielded by the first light-shielding wall 240A can be shielded using the third light-shielding wall 130M. Also, because of the presence of the third light-shielding wall 130Y, the stray light derived from the beam BK and not shielded by the second light-shielding wall 120A can be shielded using the third light-shielding wall 130Y.

The end surfaces 240E of the first light-shielding walls 240A and 240B, which are positioned close to the frame base wall 110, are inclined so as to extend toward the cover base wall 210 as extending toward the corresponding scanning lenses 60YM and 60CK in the second direction. Hence, reflection of lights proceeding from the light source devices LM1 and LM2 on the respective end surfaces 240E can be restrained.

The end surfaces 120E of the second light-shielding walls 120A and 120B, which are positioned close to the cover base wall 210, are inclined so as to extend toward the frame base wall 110 as extending away from the corresponding scanning lenses 60YM and 60CK in the second direction. Accordingly, reflection of lights proceeding from the light source devices LM1 and LM2 on the respective end surfaces 120E can be restrained.

Since the end surface 130E of the third light-shielding wall 130C, which is positioned close to the optical axis X31 of the scanning lens 70C, is inclined so as to extend away from the optical axis X31 as extending toward the scanning lens 70C, reflection of light proceeding from the light source device LM2 on the end surface 130E of the third light-shielding wall 130C can be restrained. Further, since the end surface 130E of the third light-shielding wall 130K, which is positioned close to the optical axis X32 of the scanning lens 70K, is inclined so as to extend away from the optical axis X32 as extending toward the scanning lens 70K, reflection of light proceeding from the light source device LM2 on the end surface 130E of the third light-shielding wall 130K can be restrained.

The third light-shielding wall 130C is positioned on the opposite side of the optical axis X31 of the scanning lens 70C from the polygon mirror 51 in the second direction. Accordingly, the scanning lens 70C can be positioned close to the scanning lens 60CK. Hence, the frame 100 can be made compact, thereby downsizing the scanning optical device 4.

Further, the scanning optical device 4 includes the elastic members 400A and 400B for sealing gaps between the first light-shielding walls 240A and 240B and the corresponding scanning lenses 60YM and 60CK. The elastic members 400A and 400B can restrain dust from entering the scanning optical device 4 through the gaps between the cover 200 and the corresponding scanning lenses 60YM and 60CK. Further, the elastic members 400A and 400B can also restrain stray light from passing through portions between the first light-shielding walls 240A and 240B and the corresponding scanning lenses 60YM and 60CK.

As illustrated in FIG. 12, each of the first light-shielding walls 240A and 240B has such a shape that each of the first light-shielding walls 240A and 240B is bent so as to extend away from the rotation axis X1 of the polygon mirror 51 in the second direction. This shape of the first light-shielding walls 240A and 240B can ensure the distance in the second direction from the polygon mirror 51 to the first light-shielding walls 240A and 240B, thereby restraining generation of noise due to the rotation of the polygon mirror 51.

In other words, the distance D1 in the second direction from the rotation axis X1 of the polygon mirror 51 to the first parts 241 of the first light-shielding walls 240A and 240B is greater than the distance D2 in the second direction from the rotation axis X1 of the polygon mirror 51 to the second parts 242 of the first light-shielding walls 240A and 240B, thereby ensuring the sufficient distance in the second direction from the polygon mirror 51 to the first light-shielding walls 240A and 240B. Consequently, generation of noise due to the rotation of the polygon mirror 51 can be further restrained.

The frame 100 includes the recessed parts 140 in which the protruding parts 63 of the scanning lenses 60YM and 60CK are respectively fitted, thereby positioning the scanning lenses 60YM and 60CK relative to the frame 100.

Each of the second light-shielding walls 120A and 120B has a shape in conformance with the shape of the emitting surface 62 of the corresponding one of the scanning lenses 60YM and 60CK. With this structure, the second light-shielding walls 120A and 120B can be made compact along the corresponding scanning lenses 60YM and 60CK. Hence, the frame 100 can be made compact to thereby downsize the scanning optical device 4.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below.

Figure 14A:
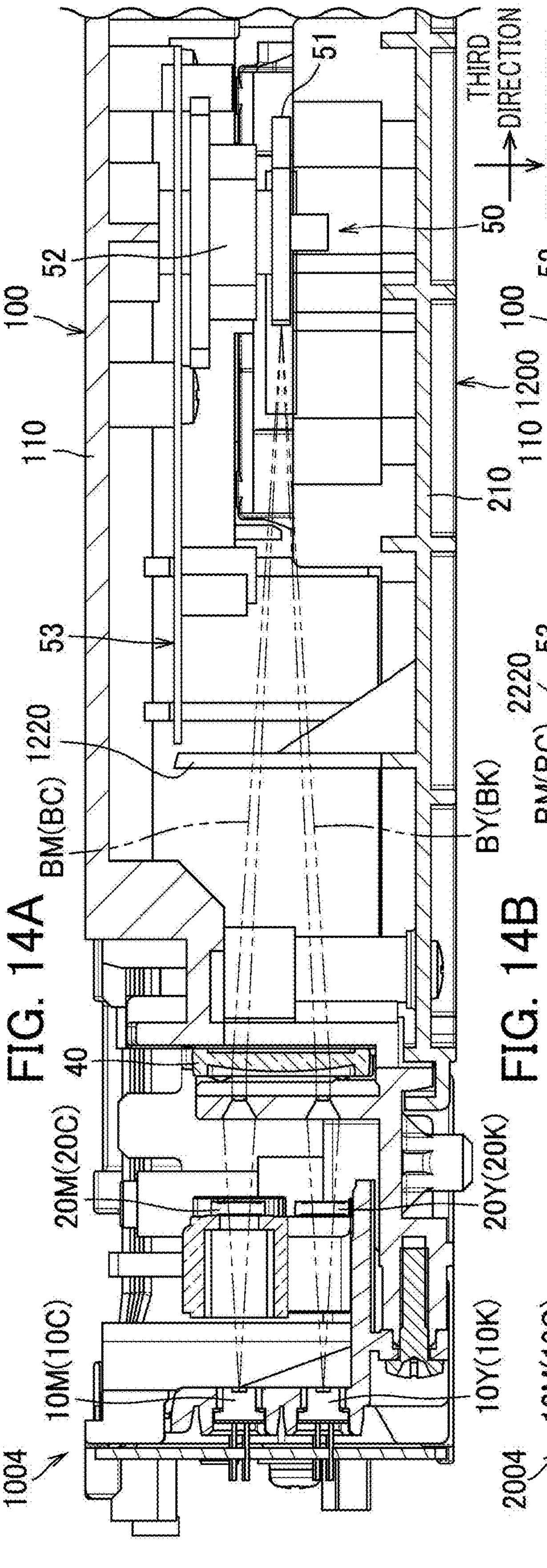
FIG. 14A is a cross-sectional view of a light-shielding wall.

FIG. 14A illustrates a scanning optical device 1004 according to a modification of the scanning optical device 4. The scanning optical device 1004 includes a cover 1200 instead of the cover 200, and the cover 1200 includes a light-shielding wall 1220 instead of the light-shielding wall 220. Similar to the above-described embodiment, the light-shielding wall 1220 is positioned closer to the coupling lenses 20Y, 20M, 20C, and 20K than the board 53 of the deflector 50 is to the coupling lenses 20Y, 20M, 20C, and 20K in the third direction. Accordingly, the light-shielding wall 1220 according to the modification can have such a structure that the light-shielding wall 220 extends to the position of the board 53 in the first direction.

Figure 14B:
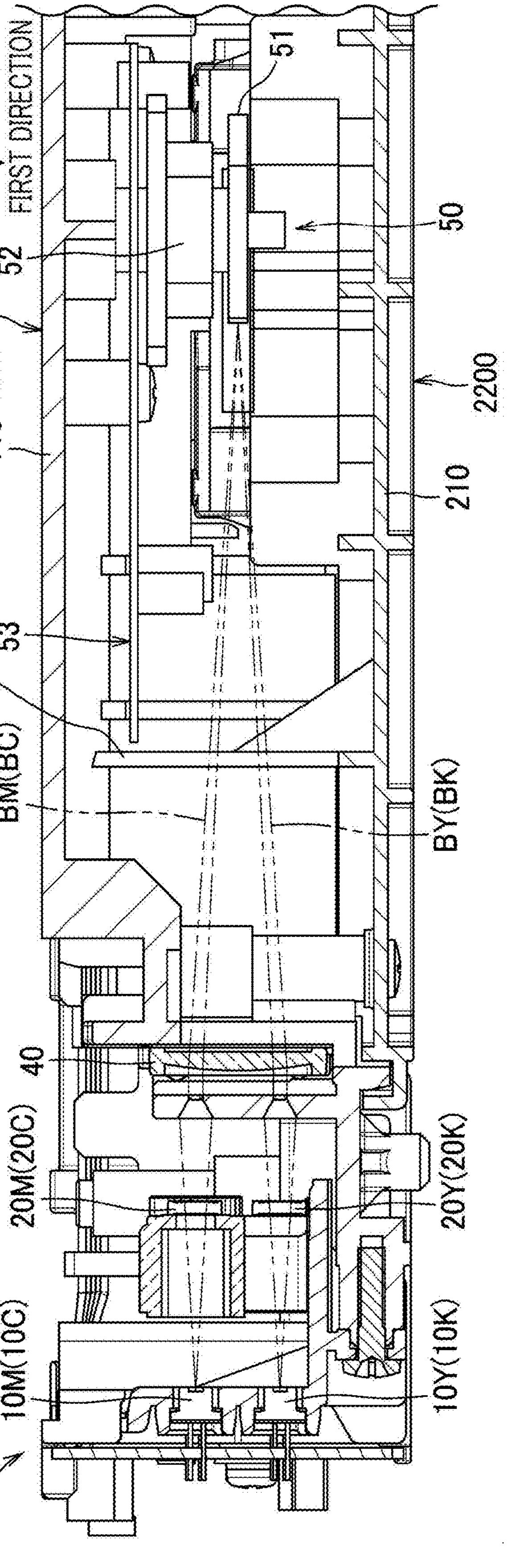
FIG. 14B is a cross-sectional view of a light-shielding wall.

FIG. 14B illustrates a scanning optical device 2004 according to another modification of the scanning optical device 4. The scanning optical device 2004 includes a cover 2200 including a light-shielding wall 2220. The light-shielding wall 2220 extends from the cover base wall 210 to a position closer to the frame base wall 110 than the board 53 is to the frame base wall 110 in the first direction. The structures according to the modifications in FIGS. 14A and 14B can restrain stray light from reaching the polygon mirror 51 through a portion between the light-shielding wall 1220, 2220 and the frame base wall 110.

Figure 15:
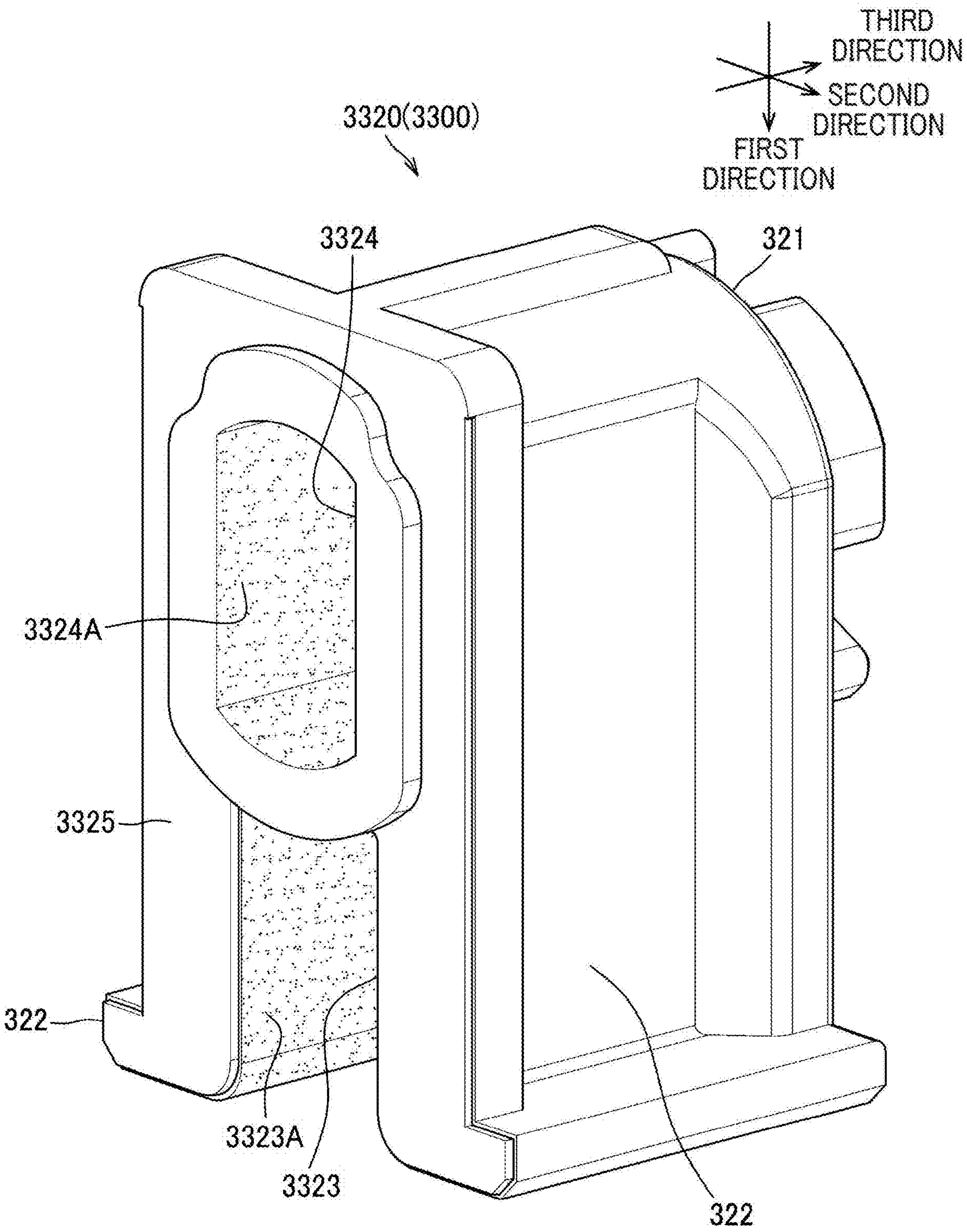
FIG. 15 is a perspective view of a second holder.

FIG. 15 illustrates a holder 3300 according to a modification of the holder 300. The holder 3300 includes a second holder 3320 instead of the second holder 320. The second holder 3320 has a recessed part 3323, and a hole part 3324. The surface of the second holder 3320 that defines the recessed part 3323 includes a scattering surface 3323A, and the surface of the second holder 3320 that defines the hole part 3324 includes a scattering surface 3324A for scattering light. Also, an incident-side end surface 3325 of the second holder 3320 does not include the scattering surface 325A, different from the incident-side end surface 325 of the second holder 320 in the embodiment. Since the inner surfaces defining the recessed part 3323 and the hole part 3324 of the second holder 3320 include the scattering surfaces 3323A and 3324A, respectively, formation of stray light due to reflection of light on the inner surfaces of the holder 3300 can be restrained.

In the above-described embodiment, each of the second holders 320 (the holders 300) includes the recessed part 323 allowing the light emitted from the corresponding one of the light sources 10Y and 10K to pass therethrough. As a modification, instead of the recessed part 323, each of the holders 300 may include a hole part allowing the light emitted from the corresponding one of the light sources 10Y and 10K to pass therethrough. In this case, an inner surface of the holder 300 defining the hole part may include a scattering surface similar to the hole part 3324 illustrated in FIG. 15 for scattering light. With this structure, formation of stray light due to reflection of the light on the inner surfaces of the holder 300 can be restrained. Note that the holder 300 may not have any scattering surface.

In the above-described embodiment, each of the holders 300 includes the second holder 320, which is a transparent part allowing the light emitted from the corresponding light sources 10 to pass therethrough. As a modification, each of the holders 300 may not have such a transparent part.

In the above-described embodiment, the frame 100 includes the first aperture wall 30A and the second aperture wall 30B. As a modification, the cover 200 may include the first aperture wall 30A and the second aperture wall 30B. Alternatively, the frame 100 may include one of the first aperture wall 30A and the second aperture wall 30B, and the cover 200 may include the other of the first aperture wall 30A and the second aperture wall 30B.

In the above-described embodiment, the first end surface 221 of the light-shielding wall 220 is inclined in order to restrain reflection of light. As a modification, the first end surface 221 may not have an inclined structure. The same is applied with respect to the second end surface 222 and the third end surface 223 of the light-shielding wall 220, the end surfaces 240E of the first light-shielding walls 240A and 240B, the end surfaces 120E of the second light-shielding walls 120A and 120B, and the end surfaces 130E of the third light-shielding walls 130C and 130K. Similarly, the surfaces of the second aperture wall 30B, which define the aperture diaphragms 32A and 32B, may not have an inclined structure.

In the above-described embodiment, the light-shielding wall 220 overlaps with a part of the cables 90 when viewed in the first direction. However, the light-shielding wall 220 need not overlap with a part of the cables 90 when viewed in the first direction.

In the above-described embodiment, the light-shielding wall 220 overlaps with the first capacitor 54 when viewed in the third direction. However, as a modification, the light-shielding wall 220 may not overlap with the first capacitor 54 when viewed in the third direction.

In the above-described embodiment, the first capacitor 54 is positioned between the optical axis X21 of the coupling lens 20Y and the optical axis X22 of the coupling lens 20K. However, the first capacitor 54 may not be positioned between the optical axis X21 and the optical axis X22.

In the above-described embodiment, the light-shielding wall 220 is positioned closer to the coupling lenses 20 than the board 53 of the deflector 50 is to the coupling lenses 20 in the third direction. However, the light-shielding wall 220 may be positioned to overlap with the board 53 of the deflector 50 when viewed in the first direction.

In the above-described embodiment, the light-shielding wall 220 extends to a position closer to the frame base wall 110 than the polygon mirror 51 is to the frame base wall 110 in the first direction. As a modification, the light-shielding wall 220 may not extend to the position of the polygon mirror 51 in the first direction.

In the above-described embodiment, the reinforcing wall 230 overlaps with the board 53 of the deflector 50 when viewed in the first direction. However, the reinforcing wall 230 may not overlap with the board 53 when viewed in the first direction.

The above-described embodiment describes a structure in which the cover 200 includes the reinforcing wall 230. However, the reinforcing wall 230 may be omitted from the cover 200. Further, in the above-described embodiment, the light-shielding wall 220 is provided in the cover 200. However, the light-shielding wall 220 may also be omitted from the cover 200.

In the above-described embodiment, the third light-shielding wall 130C is positioned on the opposite side of the optical axis X31 of the scanning lens 70C from the polygon mirror 51 in the second direction. As a modification, the third light-shielding wall 130C and the polygon mirror 51 may be positioned on the same side with respect to the optical axis X31. The same is true with respect to the third light-shielding walls 130Y, 130M, and 130K.

In the above-described embodiment, each of the second light-shielding walls 120A and 120B has a bow-like shape in conformance with the emitting surface 62 of the corresponding one of the scanning lenses 60YM and 60CK. However, the second light-shielding walls 120A and 120B may have a linear shape extending in the third direction.

In the above-described embodiment, the frame 100 includes the third light-shielding walls 130Y, 130M, 130C, and 130K. However, the frame 100 may not include the third light-shielding walls 130Y, 130M, 130C, and 130K. Further, in the above-described embodiment, the scanning optical device 4 includes the first light-shielding walls 240A and 240B, and the second light-shielding walls 120A and 120B. However, the scanning optical device 4 may include only the first light-shielding walls 240A and 240B or the second light-shielding walls 120A and 120B. Alternatively, the scanning optical device 4 may not include the first light-shielding walls 240A and 240B and the second light-shielding walls 120A and 120B.

In the above-described embodiment, the protruding parts 63 of the scanning lenses 60YM and 60CK protrude toward the polygon mirror 51. However, the protruding parts 63 may protrude in a direction away from the polygon mirror 51.

In the above-described embodiment, the scanning optical device 4 is provided in the main housing 2 of the image forming apparatus 1 such that the frame base wall 110 is positioned upward of the deflector 50 and the cover base wall 210 is positioned downward of the deflector 50. However, the arrangement of the frame base wall 110 and the cover base wall 210 may be reversed such that the frame base wall 110 is positioned downward of the deflector 50 and the cover base wall 210 is positioned upward of the deflector 50.

Although the image forming apparatus 1 is a printer in the above-described embodiment, the image forming apparatus 1 may be a copying machine or a multifunction peripheral. Further, the scanning optical device 4 may be used with a device other than the image forming apparatus 1.

The elements appearing in the embodiment and modifications described above may be suitably combined to be implemented.

The present disclosure encompasses the following aspects.

(Aspect 1) According to aspect 1, the present disclosure provides a scanning optical device including: a first light source; a second light source; a first coupling lens; a second coupling lens; a deflector; a first scanning optical system; a second scanning optical system; a frame; and a cover. The first light source is configured to emit first light. The second light source is configured to emit second light. The first coupling lens is configured to convert the first light emitted from the first light source into a first beam. The second coupling lens is configured to convert the second light emitted from the second light source into a second beam. The deflector includes a polygon mirror rotatable about a rotation axis extending in a first direction. The deflector is configured to deflect the first beam and the second beam. The first scanning optical system is configured to form an image on a first surface to be scanned using the first beam deflected by the deflector. The second scanning optical system is configured to form an image on a second surface to be scanned using the second beam deflected by the deflector. The frame includes: a frame base wall on which the deflector is mounted. The cover includes: a cover base wall; and a light-shielding wall. The cover base wall is positioned on an opposite side of the deflector from the frame base wall in the first direction and covers the deflector. The light-shielding wall extends toward the frame base wall from the cover base wall. The first coupling lens and the second coupling lens are arranged in a second direction orthogonal to the first direction. The polygon mirror is positioned between the first scanning optical system and the second scanning optical system in the second direction. The light-shielding wall is positioned between the first coupling lens and the second coupling lens, and the polygon mirror in a third direction orthogonal to both the first direction and the second direction. The light-shielding wall is also positioned between an optical axis of the first coupling lens and an optical axis of the second coupling lens in the second direction.

(Aspect 2) In the scanning optical device according to aspect 1, the light-shielding wall extends to a position closer to the frame base wall than the polygon mirror is to the frame base wall in the first direction.

(Aspect 3) The scanning optical device according to aspect 1, further includes: a third light source; a fourth light source; a third coupling lens; and a fourth coupling lens. The third light source is configured to emit third light. The fourth light source is configured to emit fourth light. The third coupling lens is configured to convert the third light emitted from the third light source into a third beam. The third coupling lens and the first coupling lens are arranged in the first direction. The fourth coupling lens is configured to convert the fourth light emitted from the fourth light source into a fourth beam. The fourth coupling lens and the second coupling lens are arranged in the first direction. The deflector is further configured to deflect the third beam and the fourth beam. The first scanning optical system is further configured to form an image on a third surface to be scanned using the third beam deflected by the deflector. The second scanning optical system is further configured to form an image on a fourth surface to be scanned using the fourth beam deflected by the deflector.

(Aspect 4) In the scanning optical device according to aspect 3, the third coupling lens is positioned farther from the cover base wall than the first coupling lens is from the cover base wall in the first direction. The fourth coupling lens is positioned farther from the cover base wall than the second coupling lens is from the cover base wall in the first direction. The scanning optical device further includes: a condenser lens configured to refract the third beam and the fourth beam toward the cover base wall in the first direction to focus the third beam and the fourth beam onto mirror surfaces of the polygon mirror. The light-shielding wall is positioned between the condenser lens and the polygon mirror in the third direction.

(Aspect 5) In the scanning optical device according to aspect 1, the deflector further includes: a motor; and a board on which the motor is mounted. The motor is configured to rotate the polygon mirror. The light-shielding wall is positioned closer to the first coupling lens and the second coupling lens than the board is to the first coupling lens and the second coupling lens in the third direction.

(Aspect 6) In the scanning optical device according to aspect 5, the cover further includes: a reinforcing wall extending toward the frame base wall from the cover base wall and extending toward the polygon mirror from the light-shielding wall. The reinforcing wall overlaps with the board when viewed in the first direction.

(Aspect 7) In the scanning optical device according to aspect 1, the deflector further includes: a board; and a capacitor. The capacitor is mounted on the board to protrude toward the cover base wall. The capacitor is positioned between the light-shielding wall and the polygon mirror in the third direction. The capacitor is also positioned between the optical axis of the first coupling lens and the optical axis of the second coupling lens in the second direction.

(Aspect 8) In the scanning optical device according to aspect 7, the light-shielding wall overlaps with the capacitor when viewed in the third direction.

(Aspect 9) The scanning optical device according to aspect 1, further includes: a cable extending in the third direction from the deflector. The light-shielding wall overlaps with a part of the cable when viewed in the first direction.

(Aspect 10) In the scanning optical device according to aspect 1, the light-shielding wall has an end surface in the second direction. The end surface includes an inclined surface inclined so as to extend away from one of the optical axis of the first coupling lens and the optical axis of the second coupling lens, which is closer to the end surface, toward the polygon mirror in the third direction.

(Aspect 11) In the scanning optical device according to aspect 1, the light-shielding wall has an end surface close to the frame base wall. The end surface includes an inclined surface inclined so as to extend toward the cover base wall toward the polygon mirror in the third direction.

(Aspect 12) The scanning optical device according to aspect 1, further includes: a holder holding the first coupling lens. The holder includes: a transparent part allowing the first light emitted from the first light source to pass therethrough. The transparent part has an incident-side end surface on a side that the first light emitted from the first light source is incident. The incident-side end surface includes a scattering surface for scattering light.

(Aspect 13) The scanning optical device according to aspect 1, further includes: a holder holding the first coupling lens. The holder has: one of a hole and a recess; and an inner surface. The one of the hole and the recess allows the first light emitted from the first light source to pass therethrough. The inner surface defines the one of the hole and the recess. The inner surface includes a scattering surface for scattering light.

(Aspect 14) In the scanning optical device according to aspect 1, one of the frame and the cover includes: an aperture wall. The aperture wall has: an aperture diaphragm; and an inner surface. The aperture diaphragm allows the first beam traveling from the first coupling lens toward the polygon mirror to pass therethrough. The inner surface defines the aperture diaphragm. The inner surface includes an inclined surface inclined so as to extend away from the optical axis of the first coupling lens toward the polygon mirror in the third direction.

(Aspect 15) According to aspect 15, the present disclosure also provides an image forming apparatus including: a scanning optical device including: a first light source; a second light source; a first coupling lens; a second coupling lens; a deflector; a first scanning optical system; a second scanning optical system; a frame; and a cover. The first light source is configured to emit first light. The second light source is configured to emit second light. The first coupling lens is configured to convert the first light emitted from the first light source into a first beam. The second coupling lens is configured to convert the second light emitted from the second light source into a second beam. The deflector includes a polygon mirror rotatable about a rotation axis extending in a first direction. The deflector is configured to deflect the first beam and the second beam. The first scanning optical system is configured to form an image on a first surface to be scanned using the first beam deflected by the deflector. The second scanning optical system is configured to form an image on a second surface to be scanned using the second beam deflected by the deflector. The frame includes: a frame base wall on which the deflector is mounted. The cover includes: a cover base wall; and a light-shielding wall. The cover base wall is positioned on an opposite side of the deflector from the frame base wall in the first direction and covers the deflector. The light-shielding wall extends toward the frame base wall from the cover base wall. The first coupling lens and the second coupling lens are arranged in a second direction orthogonal to the first direction. The polygon mirror is positioned between the first scanning optical system and the second scanning optical system in the second direction. The light-shielding wall is positioned between the first coupling lens and the second coupling lens, and the polygon mirror in a third direction orthogonal to both the first direction and the second direction. The light-shielding wall is also positioned between an optical axis of the first coupling lens and an optical axis of the second coupling lens in the second direction. The scanning optical device is provided while the frame base wall is positioned upward of the deflector and the cover base wall is positioned downward of the deflector.

Here, in a conventional scanning optical device including a plurality of light sources, a deflector, an imaging optical system, and a casing having a bottom surface on which the deflector is mounted, light-shielding walls are provided at the casing so as to upstand from the bottom surface of the casing. The light-shielding walls are configured to shield stray light emitted from the light sources and reflected by the casing to travel in an unintended direction. The light-shielding walls of the conventional scanning optical device cannot be positioned at a desired position since the light-shielding walls upstand from the bottom surface of the casing on which the deflector is mounted, thereby making it difficult to effectively shield the stray light.

However, in the scanning optical device according to the above aspects, the light-shielding wall can be placed at a position in which the light-shielding wall can effectively shield stray light. The same is applied with respect to the image forming apparatus including the scanning optical device.

What is claimed is:

1. A scanning optical device comprising:

a first light source device configured to emit a first beam;

a second light source device configured to emit a second beam;

a deflector including a polygon mirror rotatable about a rotation axis extending in a first direction, the deflector being configured to deflect the first beam and the second beam;

a first scanning optical system including a first scanning lens on which the first beam deflected by the deflector is configured to be incident, the first scanning optical system being configured to form an image on a first surface to be scanned using the first beam deflected by the deflector, the first scanning lens having an incident surface and an emitting surface opposite the incident surface;

a second scanning optical system including a second scanning lens on which the second beam deflected by the deflector is configured to be incident, the second scanning optical system being configured to form an image on a second surface to be scanned using the second beam deflected by the deflector, the second scanning lens being positioned on an opposite side of the polygon mirror from the first scanning lens in a second direction orthogonal to the first direction;

a frame including:

a frame base wall on which the deflector is mounted; and a cover including:

a cover base wall positioned on an opposite side of the deflector from the frame base wall in the first direction and covering the deflector, wherein the cover further includes:

a first light-shielding wall extending toward the frame base wall from the cover base wall, the first light-shielding wall being positioned between the polygon mirror and the first scanning lens, the first light-shielding wall overlapping with the incident surface when viewed in the second direction, and wherein the frame further includes:

a second light-shielding wall extending toward the cover base wall from the frame base wall, the second light-shielding wall being positioned closer to the emitting surface than to the incident surface, the second light-shielding wall overlapping with the emitting surface when viewed in the second direction.

2. The scanning optical device according to claim 1, wherein the first light-shielding wall has a first end surface close to the frame base wall, the first end surface being positioned closer to the cover base wall than the polygon mirror is to the cover base wall in the first direction, and wherein the second light-shielding wall has a second end surface close to the cover base wall, the second end surface being positioned closer to the frame base wall than the polygon mirror is to the frame base wall in the first direction.

3. The scanning optical device according to claim 1, wherein, when viewed in the first direction, the first light-shielding wall has a recessed portion recessed away from the rotation axis in the second direction.

4. The scanning optical device according to claim 1, wherein the first scanning lens has a center portion in a third direction orthogonal to both the first direction and the second direction, wherein the first light-shielding wall has:

a first part facing the rotation axis in the second direction; and a second part facing the center portion of the first scanning lens in the second direction, and wherein a distance from the rotation axis to the first part in the second direction is greater than a distance from the rotation axis to the second part in the second direction.

5. The scanning optical device according to claim 4, wherein the first scanning lens includes:

a protruding part protruding toward the polygon mirror from the center portion of the first scanning lens, and wherein the frame includes:

a recessed part in which the protruding part is fitted.

6. The scanning optical device according to claim 1, wherein the first light-shielding wall has an end surface close to the frame base wall, the end surface being inclined so as to extend toward the cover base wall toward the first scanning lens in the second direction.

7. The scanning optical device according to claim 1, wherein the emitting surface is a convex surface and has a center portion in a third direction orthogonal to both the first direction and the second direction, the center portion of the emitting surface protruding in the second direction, and wherein the second light-shielding wall has a shape in conformance with the emitting surface when viewed in the first direction.

8. The scanning optical device according to claim 1, wherein the second light-shielding wall has an end surface close to the cover base wall, the end surface being inclined so as to extend toward the frame base wall away from the first scanning lens in the second direction.

9. The scanning optical device according to claim 1, wherein the first scanning optical system further includes:

a reflecting mirror configured to reflect the first beam exiting the first scanning lens toward the first surface to be scanned; and a third scanning lens configured to form an image on the first surface to be scanned using the first beam reflected by the reflecting mirror, the third scanning lens having an incident surface, and wherein the frame further includes:

a third light-shielding wall extending in a third direction orthogonal to both the first direction and the second direction, the third light-shielding wall being positioned between the reflecting mirror and the third scanning lens, the third light-shielding wall overlapping with the incident surface of the third scanning lens when viewed in the first direction.

10. The scanning optical device according to claim 9, wherein the third light-shielding wall is positioned on an opposite side of an optical axis of the third scanning lens from the polygon mirror in the second direction.

11. The scanning optical device according to claim 9, wherein the third light-shielding wall has an end surface close to an optical axis of the third scanning lens, the end surface being inclined so as to extend away from the optical axis toward the third scanning lens.

12. The scanning optical device according to claim 1, further comprising:

an elastic member positioned between the cover and the first scanning lens, the elastic member sealing a gap between the first light-shielding wall and the first scanning lens.

13. An image forming apparatus comprising:

a scanning optical device comprising:

a first light source device configured to emit a first beam;

a second light source device configured to emit a second beam;

a deflector including a polygon mirror rotatable about a rotation axis extending in a first direction, the deflector being configured to deflect the first beam and the second beam;

a first scanning optical system including a first scanning lens on which the first beam deflected by the deflector is configured to be incident, the first scanning optical system being configured to form an image on a first surface to be scanned using the first beam deflected by the deflector, the first scanning lens having an incident surface and an emitting surface opposite the incident surface;

a second scanning optical system including a second scanning lens on which the second beam deflected by the deflector is configured to be incident, the second scanning optical system being configured to form an image on a second surface to be scanned using the second beam deflected by the deflector, the second scanning lens being positioned on an opposite side of the polygon mirror from the first scanning lens in a second direction orthogonal to the first direction;

a frame including:

a frame base wall on which the deflector is mounted; and a cover including:

a cover base wall positioned on an opposite side of the deflector from the frame base wall in the first direction and covering the deflector, wherein the cover further includes:

a first light-shielding wall extending toward the frame base wall from the cover base wall, the first light-shielding wall being positioned between the polygon mirror and the first scanning lens, the first light-shielding wall overlapping with the incident surface when viewed in the second direction, wherein the frame further includes:

a second light-shielding wall extending toward the cover base wall from the frame base wall, the second light-shielding wall being positioned closer to the emitting surface than to the incident surface, the second light-shielding wall overlapping with the emitting surface when viewed in the second direction, and wherein the scanning optical device is provided while the frame base wall is positioned upward of the deflector and the cover base wall is positioned downward of the deflector.

14. A scanning optical device comprising:

a first light source device configured to emit a first beam;

a second light source device configured to emit a second beam;

a deflector including a polygon mirror rotatable about a rotation axis extending in a first direction, the deflector being configured to deflect the first beam and the second beam;

a first scanning lens on which the first beam deflected by the deflector is configured to be incident, the first scanning lens having an incident surface and an emitting surface opposite the incident surface;

a second scanning lens on which the second beam deflected by the deflector is configured to be incident, the second scanning lens being positioned on an opposite side of the polygon mirror from the first scanning lens in a second direction orthogonal to the first direction;

a frame base wall on which the deflector is mounted;

a cover base wall positioned on an opposite side of the deflector from the frame base wall in the first direction and covering the deflector; and a first light-shielding wall extending toward the frame base wall from the cover base wall, the first light-shielding wall being positioned between the polygon mirror and the first scanning lens, the first light-shielding wall overlapping with the incident surface when viewed in the second direction.

15. The scanning optical device according to claim 14, further comprising:

a second light-shielding wall extending toward the cover base wall from the frame base wall, the second light-shielding wall being positioned closer to the emitting surface than to the incident surface, the second light-shielding wall overlapping with the emitting surface when viewed in the second direction.

* * * * *